US010701931B2

(12) United States Patent
Berna et al.

(10) Patent No.: US 10,701,931 B2
(45) Date of Patent: Jul. 7, 2020

(54) MOSQUITO ACTIVATING FORMULATIONS

(71) Applicants: Commonwealth Scientific and Industrial Research Organisation, Acton, Australian Capital Territory (AU); The Council of the Queensland Institute of Medical Research, Herston, Queensland (AU)

(72) Inventors: Amalia Berna, St. Louis, MO (US); Stephen Trowell, Oxley (AU); James McCarthy, Herston (AU); Maggy Sikulu, St Lucia (AU)

(73) Assignee: Commonwealth Scientific and Industrial Research Organisation, Acton, Australian Capital Territory (AU)

( * ) Notice: Subject to any disclaimer, the term of this patent is extended or adjusted under 35 U.S.C. 154(b) by 0 days.

(21) Appl. No.: 15/768,456

(22) PCT Filed: Oct. 14, 2016

(86) PCT No.: PCT/AU2016/050966
§ 371 (c)(1),
(2) Date: Apr. 13, 2018

(87) PCT Pub. No.: WO2017/063046
PCT Pub. Date: Apr. 20, 2017

(65) Prior Publication Data
US 2019/0208777 A1 Jul. 11, 2019

(30) Foreign Application Priority Data
Oct. 16, 2015 (AU) ................. 2015904254

(51) Int. Cl.
| | | |
|---|---|---|
| A01N 31/02 | (2006.01) | |
| A01P 17/00 | (2006.01) | |
| A01P 19/00 | (2006.01) | |
| A01M 1/00 | (2006.01) | |
| A01M 1/02 | (2006.01) | |
| A01M 1/04 | (2006.01) | |
| A01M 1/06 | (2006.01) | |
| A01M 1/20 | (2006.01) | |
| A01M 1/10 | (2006.01) | |

(52) U.S. Cl.
CPC ............ *A01N 31/02* (2013.01); *A01M 1/023* (2013.01); *A01M 1/04* (2013.01); *A01M 1/06* (2013.01); *A01M 1/106* (2013.01); *A01M 1/2016* (2013.01); *Y02A 50/371* (2018.01)

(58) Field of Classification Search
CPC ......... A01N 31/02; A01M 1/023; A01M 1/04; A01M 1/06; A01M 1/2016
See application file for complete search history.

(56) References Cited

U.S. PATENT DOCUMENTS

| | | |
|---|---|---|
| 4,612,327 A | 9/1986 | Matukuma et al. |
| 5,205,064 A | 4/1993 | Nolen |
| 5,683,687 A | 11/1997 | Marin et al. |
| 5,750,129 A | 5/1998 | Wakarchuk |
| 5,799,436 A | 9/1998 | Nolen et al. |
| 6,015,570 A | 1/2000 | Tucci et al. |
| 6,326,015 B1 | 12/2001 | Tucci et al. |
| 6,925,752 B1 | 8/2005 | Cherry et al. |
| 7,771,713 B2 | 8/2010 | Bernier et al. |
| 7,987,631 B2 | 8/2011 | Schinazi et al. |
| 8,424,239 B1 | 4/2013 | Gallo |
| 2006/0099168 A1 | 5/2006 | Corzani et al. |
| 2006/0201391 A1 | 9/2006 | Scialdone |
| 2011/0251270 A1 | 10/2011 | Gries et al. |

FOREIGN PATENT DOCUMENTS

| | | |
|---|---|---|
| EP | 0 548 940 A1 | 6/1993 |
| JP | 2013-151470 A | 8/2013 |
| WO | 03/103395 A1 | 12/2003 |
| WO | 2008/116321 A1 | 10/2008 |
| WO | 2017/106914 A1 | 6/2017 |

OTHER PUBLICATIONS

Bernier et al. Laboratory Studies of Aedes aegypti Attraction to Ketones, Sulfides, and Primary Chloroalkanes Tested Alone and in Combination with L-Lactic Acid. Journal of the American Mosquito Control Association 2015, 31(1):63-70. (Year: 2015).*
Extended European Search Report for corresponding European Patent Application No. 16854650.5 dated Feb. 25, 2019, 14 pages.
Campbell, C. et al., "Organosulphur constituents in garlic oil elicit antennal and behavioural responses from the yellow fever mosquito: Garlic oil odorants and yellow fever mosquito", Journal of Applied Entomology, 135(5): 274-381 (2011).
Ditzen, M. et al., "Insect Odorant Receptors Are Molecular Targets of the Insect Repellent DEET", Science, 319(5871): 1838-1842 (2008).
International Search Report and Written Opinion of the International Searching Authority for International Patent Application No. PCT/AU2016/050966 dated Dec. 16, 2016, 12 pages.
Bernier, U. et al., "Analysis of Human Skin Emanations by Gas Chromatography/Mass Spectrometry. 2. Identification of Volatile Compounds That Are Candidate Attractants for the Yellow Fever Mosquito (*Aedes aegypti*)", Analytical Chemistry, 72(4): 747-756 (2000).

(Continued)

*Primary Examiner* — Robert A Wax
*Assistant Examiner* — Olga V. Tcherkasskaya
(74) *Attorney, Agent, or Firm* — Merchant & Gould P.C.

(57) ABSTRACT

The present invention relates to formulations useful for affecting the behaviour of mosquitoes. More specifically, the present invention relates to formulations for activating mosquitoes such as for attracting mosquitoes. The present invention further provides methods and dispensers incorporating these formulations. The formulation comprises a thio compound as the active, preferably a thioether such as allyl methyl sulphide (AMS), 1-methylthio-propane, 3-methylthio-propanol (MTPL), (E)-1-methylthio-1-propene, (Z)-1-methylthio-1-propene, or derivatives thereof.

12 Claims, 23 Drawing Sheets

(56) References Cited

OTHER PUBLICATIONS

Figure 1:
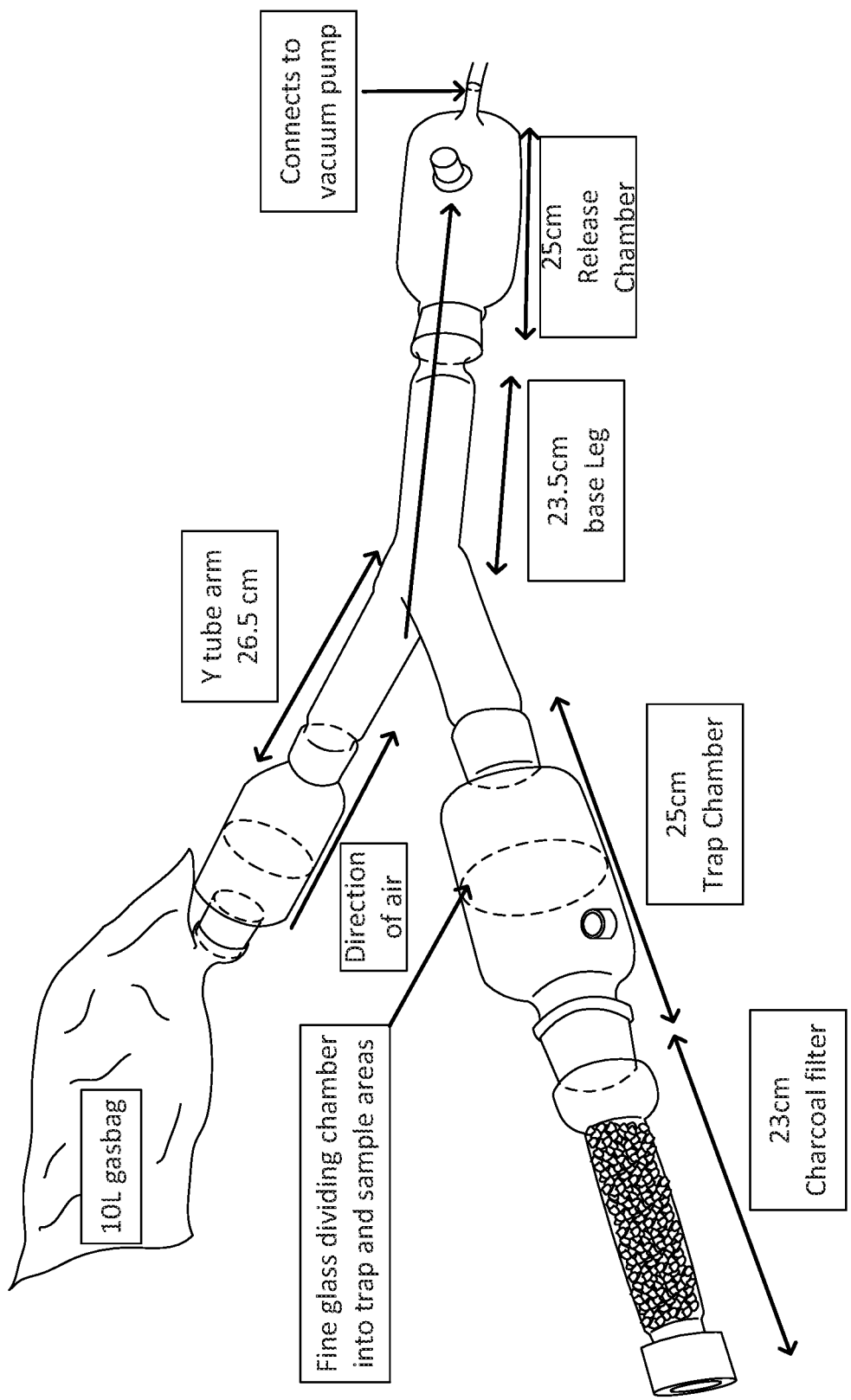

Carey, A. et al., "Odorant reception in the malaria mosquito Anopheles gambiae", Nature, 464: 66-71 (2010).
Li, W. et al., "Antifungal effect and mechanism of garlic oil on Penicillium funiculosum", Applied Microbiology and Biotechnology, 98(19): 8337-8346 (2014).
Tong, H. et al., "Topical Mosquito Repellents VIII: Substituted 2-Thio-4-Thiazolidineones and 2,4-Thiazolidinediones", Mosquito News, 35(1): 76-82 (1975).
Cork, A. et al., "Identification of electrophysiologically-active compounds for the malaria mosquito, Anopheles gambiae, in human sweat extracts" Medical and Veterinary Entomology, 10: 269-276 (1996).
Costantini, C. et al., "Electroantennogram and behavioural responses of the malaria vector Anopheles gambiae to human-specific sweat components", Medical and Veterinary Entomology, 15: 259-266 (2001).
Dekker, T. et al., "L-lactic acid: a human-signifying host cue for the anthropophilic mosquito Anopheles gambiae", Medical and Veterinary Entomology, 16: 91-98 (2002).
Hall, D. et al., "1-OCTEN-3-OL; A potent Olfactory Stimulant and Attractant for Tsetse Isolated From Cattle Odours", Insect. Sci. Applic., 5(5): 335-339 (1984).
Knols, B. et al., "Odour-mediated, host-seeking behviour of Anopheles mosquitoes: a new approach", Annals of Tropical Medicine and Parasitology, 91(1): S117-S118 (1997).
Lacroix, R. et al., "Malaria Infection Increases Attractiveness of Humans to Mosquitoes", PLoS Biology, 3(9): 1590-1593 (2005).
Lorenz, L. et al., "Taxis assays measure directional movement of mosquitoes to olfactory cues", Parasites & Vectors, 6(131): 1-12 (2013).
Ritchie, S. et al., "Confusion, knock-down and kill of Aedes aegypti using metofluthrin in domestic settings: a powerful tool to prevent dengue transmission?", Parasites & Vectors, 6(262): 1-12 (2013).
Smallegange, R. et al., "Synergism between ammonia, lactic acid and carboxylic acids as kairomones in the host-seeking behaviour of the malaria mosquito Anopheles gambiae sensu stricto (Diptera: Culicidae)", Chem. Senses (30: 145-152 (2005).
Trexler, J. et al., "Laboratory and Field Evaluations of Oviposition Responses of Aedes albopictus and Aedes triseriatus (Diptera: Culicidae) to Oak Leaf Infusions", J. Med. Entomol., 35(6): 967-976 (1998).
Vale, G. et al., "The use of 1-octen-3-ol, acetone and carbon dioxide to improve baits for tsetse flies, *Glossina* spp. (Diptera: Glossinidae)", Bull. ent. Res. 75: 219-231 (1985).
Verhulst, N. et al., "Cultured skin microbiota attracts malaria mosquitoes", Malaria Journal, 8(302): 1-12 (2009).
Zeoli, L. et al., "Controlled Release Technologies—Chapter 3", "Insect Suppression with Controlled Release Pheromone Systems, vol. I", CRC Press, 1-15 (1982).

\* cited by examiner

A

B

C

A

B

C

A

B

C

MOSQUITO ACTIVATING FORMULATIONS

This application is a National Stage Application of PCT/AU2016/050966, filed 14 Oct. 2016, which claims benefit of Serial No. 2015904254, filed 16 Oct. 2015 in Australia and which applications are incorporated herein by reference. To the extent appropriate, a claim of priority is made to each of the above-disclosed applications.

FIELD OF THE INVENTION

The present invention relates to formulations useful for affecting the behaviour of mosquitoes. More specifically, the present invention relates to formulations for activating mosquitoes such as for attracting mosquitoes. The present invention further provides methods and dispensers incorporating these formulations.

BACKGROUND OF THE INVENTION

Mosquitoes are vectors for disease in human beings and animals. These insects carry diseases such as malaria, heartworm, dengue fever, encephalitis, yellow fever and West Nile virus, causing millions of human deaths around the world every year.

Mosquitoes in the genus *Anopheles* are the principle vectors of malaria. Malaria is a devastating infectious disease caused by *Plasmodium* spp. that results in approximately 660,000 deaths per year. Recent evidence indicates that malaria probably causes double this number of deaths because it debilitates children and leaves them susceptible to fatal bacterial diseases such as pneumonia, bacteraemia and encephalitis.

*Plasmodium falciparum*, the cause of the most virulent form of malaria, has developed resistance to currently used drugs. This in turn has led to an increase in the incidence of malaria and to fewer drugs for both treatment and prophylaxis of the disease.

*Aedes aegypti* is the main vector of the viruses that cause Yellow fever and Dengue. Other viruses, the causal agents of various types of encephalitis, Zika virus and Chikungunya are also carried by *Aedes* spp. mosquitoes. *Wuchereria bancrofti* and *Brugia malayi*, parasitic roundworms that cause filariasis, are usually spread by mosquitoes in the genera *Culex, Mansonia*, and *Anopheles*.

In addition to spread of disease, mosquitoes biting humans constitutes a significant nuisance and loss of amenity and may cause economic losses due to effects on tourism and leisure activities. Thus, chemical attractants and repellants remain an important tool for reducing mosquito bites and the resulting rates of infection and spread of disease.

Female mosquitoes choose their mammalian hosts based in part on complex chemical cues. Some of these signals, such as carbon dioxide, have been well characterized on a molecular level. For example, carbon dioxide is not only a potent mosquito stimulant but also augments mosquito feeding behaviors and modulates attraction to other human body odors. Thus, carbon dioxide has been used previously as an effective tool against infection. However, *Anopheles gambiae* strains that lack functional $CO_2$ receptors are still capable of locating human hosts, indicating that additional chemical signals also drive host preference. Further, logistical issues can make the provision of carbon dioxide difficult, in particular in low resource areas.

There is a therefore a need to provide formulations for affecting the behaviour of mosquitoes.

SUMMARY OF THE INVENTION

The present inventors have surprisingly found that compounds present in *Plasmodium* sp. infected subjects, and related compounds, can be used to affect the behaviour of mosquitoes.

Accordingly, in a first embodiment the present invention provides a mosquito activating formulation comprising a thio compound. In an example, the thio compound is a thioether. For example, the thioether may be a compound of Formula 1:

Formula 1 wherein R1 and R2 are independently selected from an optionally substituted $C_{1-6}$alkyl and an optionally substituted $C_{2-6}$alkenyl. In another example, R1 and R2 are independently selected from an unsubstituted $C_{1-6}$alkyl, an unsubstituted $C_{2-6}$alkenyl and a $C_{1-6}$alkyl substituted with a hydroxyl group. In another example, the thioether is selected from the group consisting of allyl methyl sulphide, 1-methylthio-propane, 3-methylthio-propanol, (E)-1-methylthio-1-propene, (Z)-1-methylthio-1-propene, a derivative thereof, or a mixture of two or more thereof. For example, the mosquito activating formulation may comprise (E)-1-methylthio-1-propene and (Z)-1-methylthio-1-propene.

The present inventors have also found that the above referenced compounds can be used to attract mosquitoes. Thus, in another aspect, the present invention provides, a mosquito attracting formulation. In various examples, a mosquito attracting formulation may comprise one of the above referenced thio compounds.

In another example, the formulations of the present invention can comprise one or more other insect attractants. For example, the other one or more other insect attractants may be selected from the group consisting of carbon dioxide, 1-octen-3-ol, ammonia, lactic acid, or a mixture of two or more thereof.

The present inventors have also found that the above referenced compounds can affect mosquito behaviour in the absence of carbon dioxide. Thus, in a further aspect, the formulations of the present invention do not contain carbon dioxide. For example, the formulations of the present invention may be provided alone or in combination with other non $CO_2$ comprising mosquito attractants such as 1-octen-3-ol, ammonia, lactic acid, or a mixture of two or more thereof.

In another example, the formulation comprises the thio compound at a sufficiently high concentration to repel mosquitoes.

In other examples, the formulation is a solution, an oil, a gel, a cream, a wax, a solid, a gas, a spray or a foam. In another example, the formulation is formulated for slow release of the thio compound. In another example, the thio compound is embedded in a polymer. For example, the polymer may be a cellulose ether such as methyl cellulose, ethyl cellulose, carboxymethyl cellulose, hydroxyethyl cellulose or hydroxypropyl cellulose, a cellulose ester such as acetyl cellulose, high density polyethylene, low density polyethylene, biodegradable thermoplastic polyurethane, a biodegradable ethylene polymer having ester linkages in the main chain, or a poly(epsilon-caprolactone) homopolymer.

In another example, the formulation is formulated for release of the compound(s) by heating.

In an example, the above referenced formulations may be provided in a dispenser. In an example, the dispenser is a trap or a lure. In an example, the trap is a container trap. In an example, the trap and/or lure further comprises a bait comprising an insecticide.

In an example, the present invention relates to use of the above referenced formulations or dispensers for activating mosquitoes. In another example, the present invention relates to a method for activating mosquitoes, the method comprising releasing an above referenced thio compound or thioether. Such methods can involve release of compounds via various means. For example, compounds can be released by evaporation, diffusion, atomization or dispersion.

In another example of the above referenced formulations, dispensers, uses and methods, the mosquito is an *Anopheles* spp., *Aedes* spp., *Culex* spp., *Culiseta* spp., *Haemagogus* spp. or a combination of two or more thereof. For example, the mosquito may be *Anopheles* spp. In this example, the *Anopheles* spp. may be *An. arabiensis, An. funestus, An. gambiae, An. moucheti, An. nili, An. stephensi, An. bellator, An. cruzii, An. farauti* or a combination of two or more thereof. In another example, the mosquito may be *Aedes* spp. For example, the mosquito may be *Aedes aegypti, Aedes albopictus* or a combination thereof.

Any example herein shall be taken to apply mutatis mutandis to any other example unless specifically stated otherwise.

The present invention is not to be limited in scope by the specific examples described herein, which are intended for the purpose of exemplification only. Functionally-equivalent products, compositions and methods are clearly within the scope of the invention, as described herein.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The invention is hereinafter described by way of the following non-limiting Examples and with reference to the accompanying drawings.

BRIEF DESCRIPTION OF THE ACCOMPANYING DRAWINGS

FIG. 1. Labelled Y-tube olfactometer.

Figure 2:
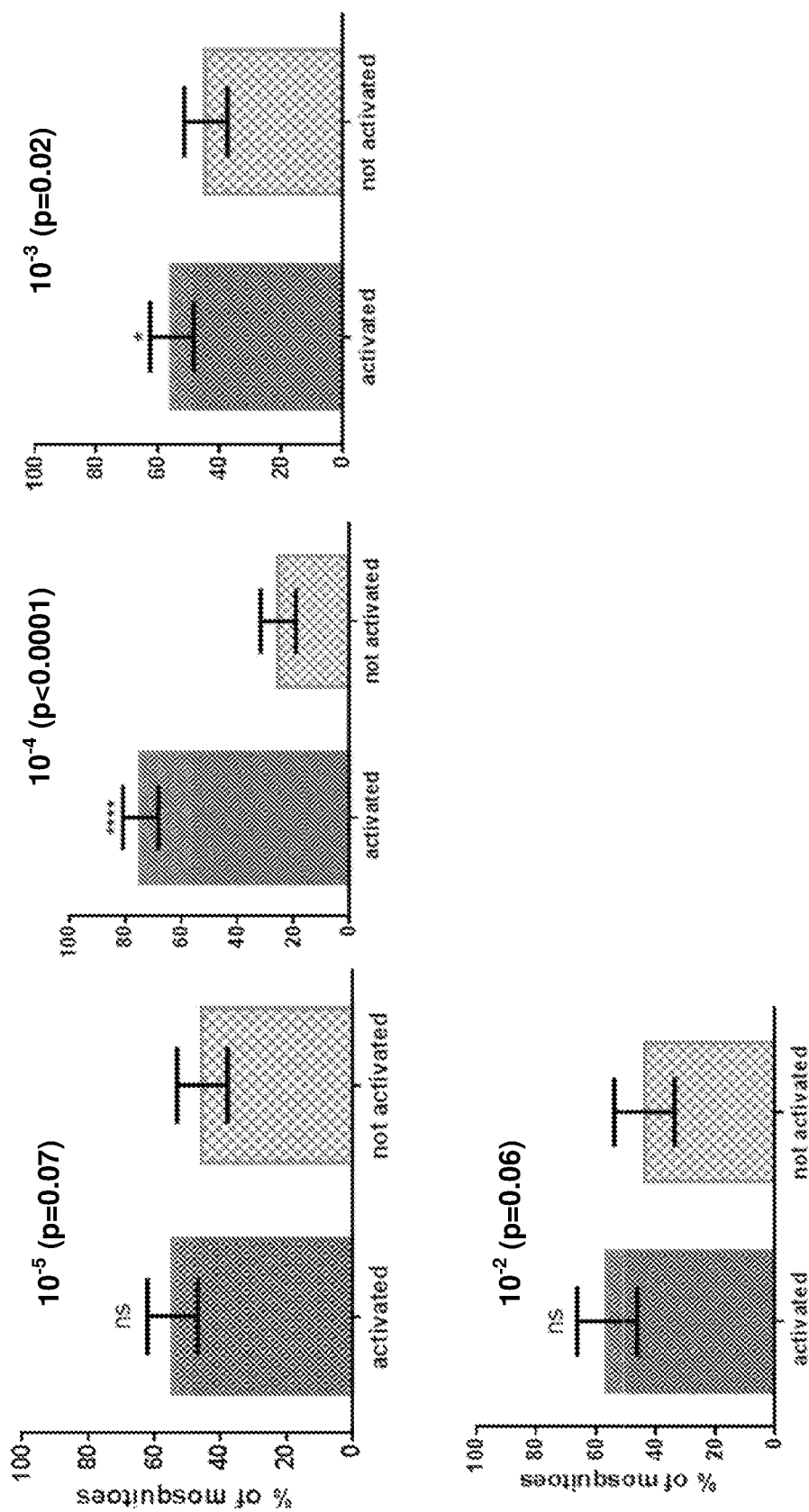

FIG. 2. 1-methylthio-1-propene (MTPE) (as a mix of E and Z enantiomers) activation.

Figure 3:
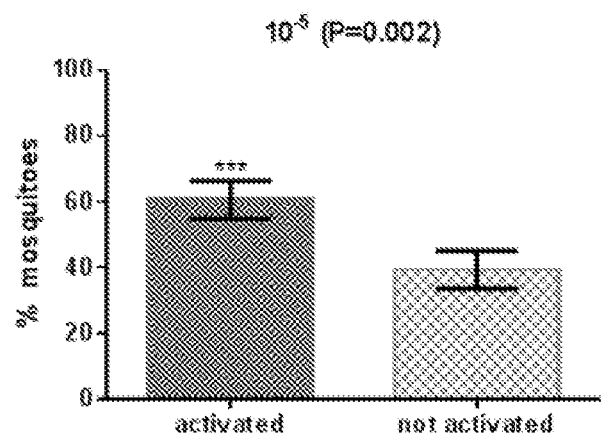
Figure 3:
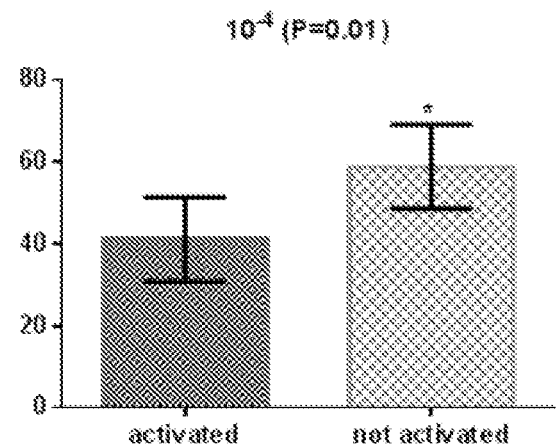
Figure 3:
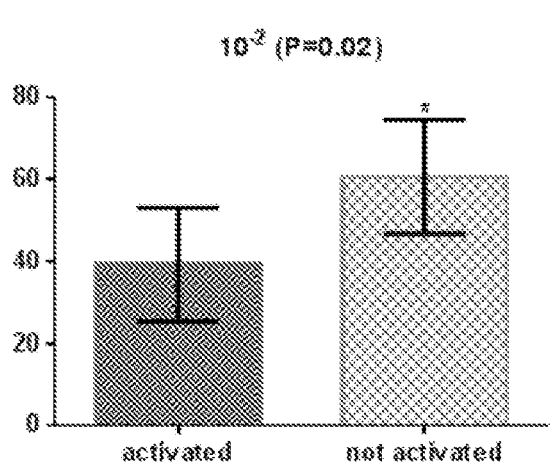

FIG. 3. Allyl methyl sulphide (AMS) activation.

Figure 4:
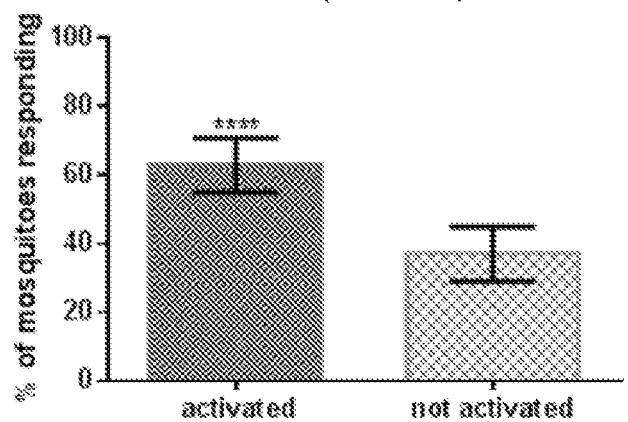
Figure 4:
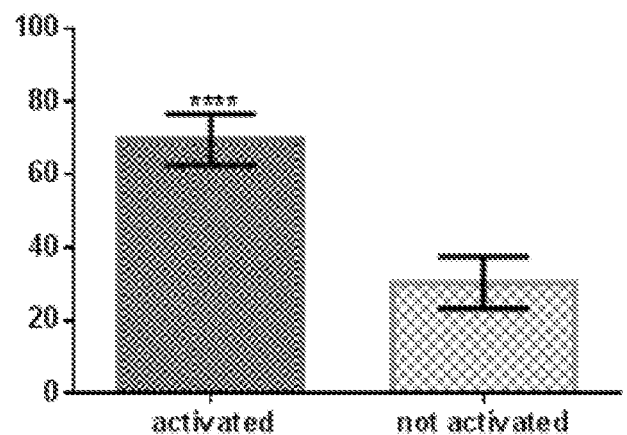
Figure 4:
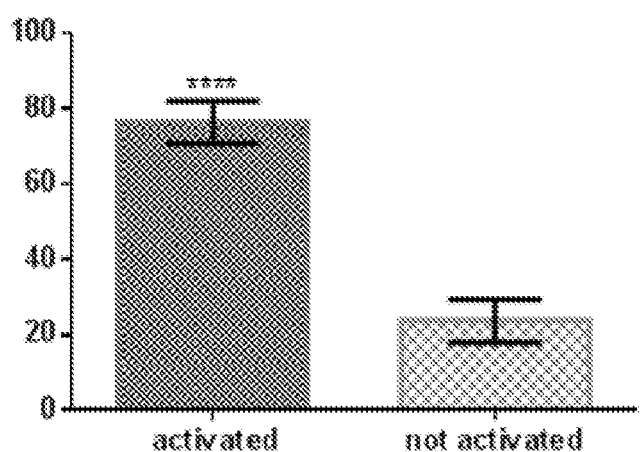

FIG. 4. 3-methylthio-propanol (MTPL) activation.

Figure 5:
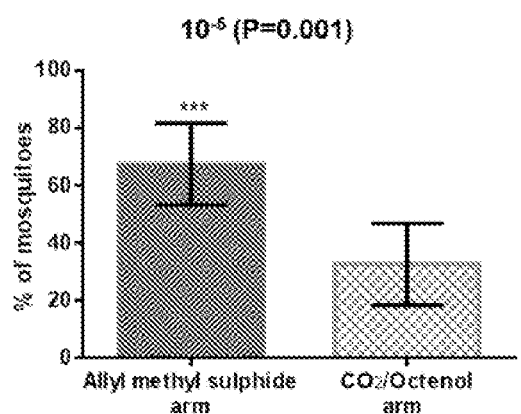
Figure 5:
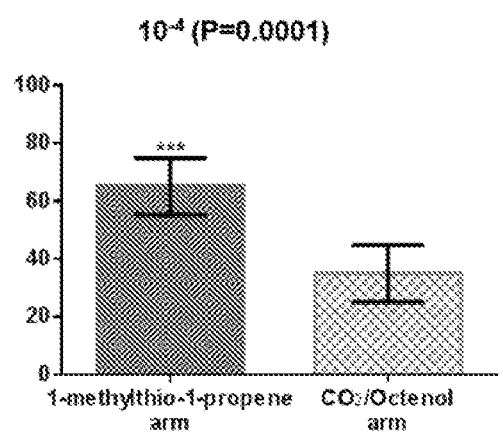
Figure 5:
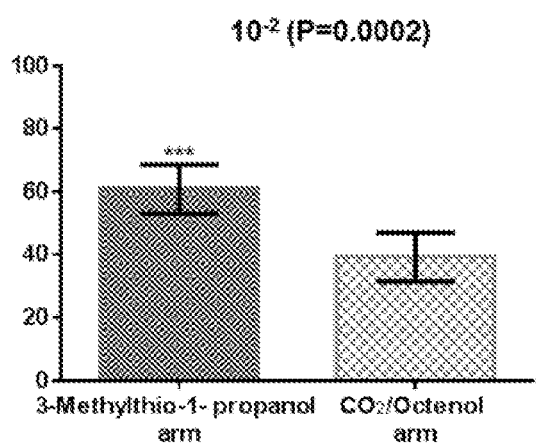

FIG. 5. Mosquito attraction comparison of (A) Allyl methyl sulphide (AMS); (B) 1-methylthio-1-propene (as a mix of E and Z enantiomers) (MTPE); (C) 3-methylthio-propanol (MTPL) with 1-octen-3-ol/$CO_2$.

Figure 6:
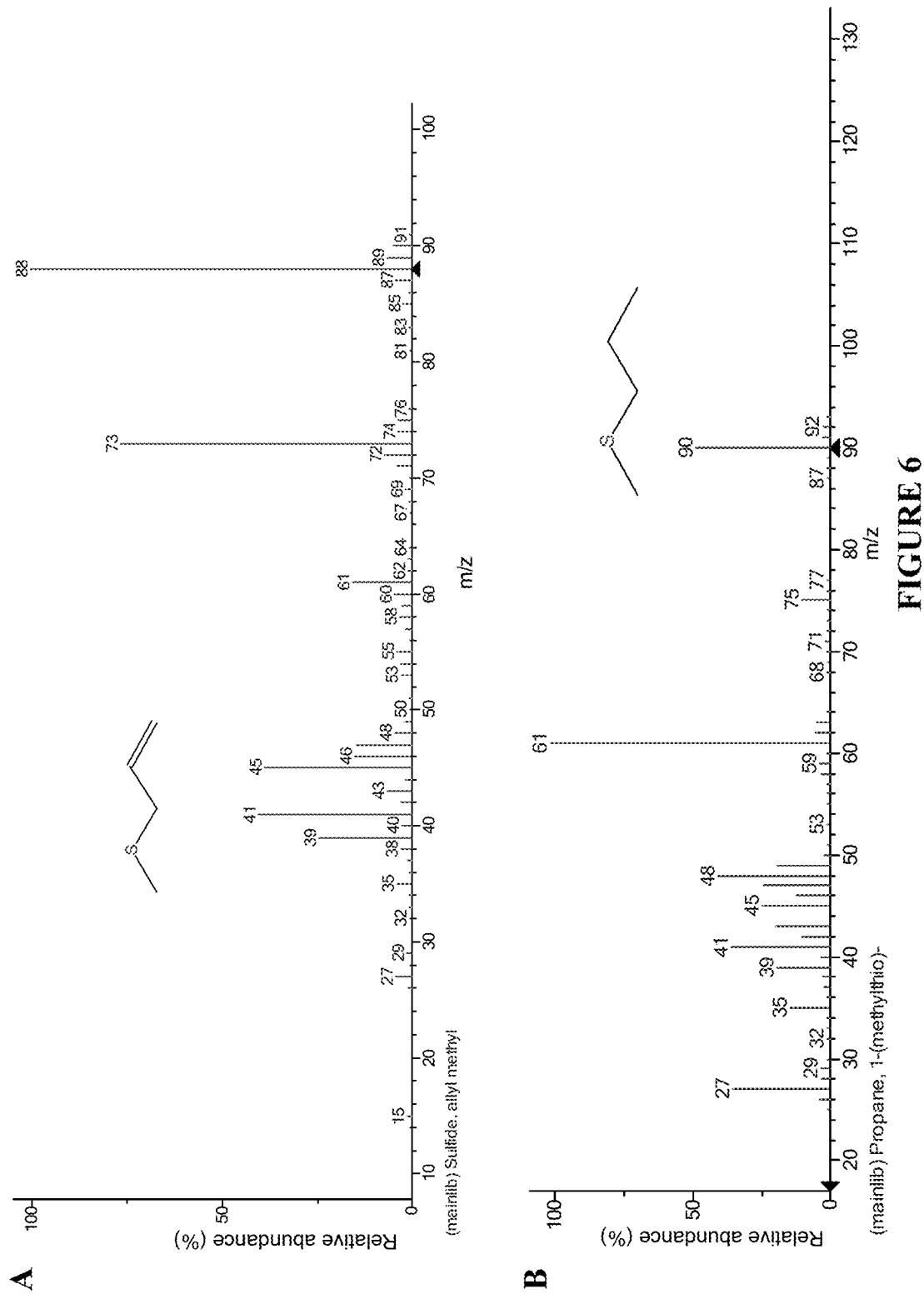
Figure 6:
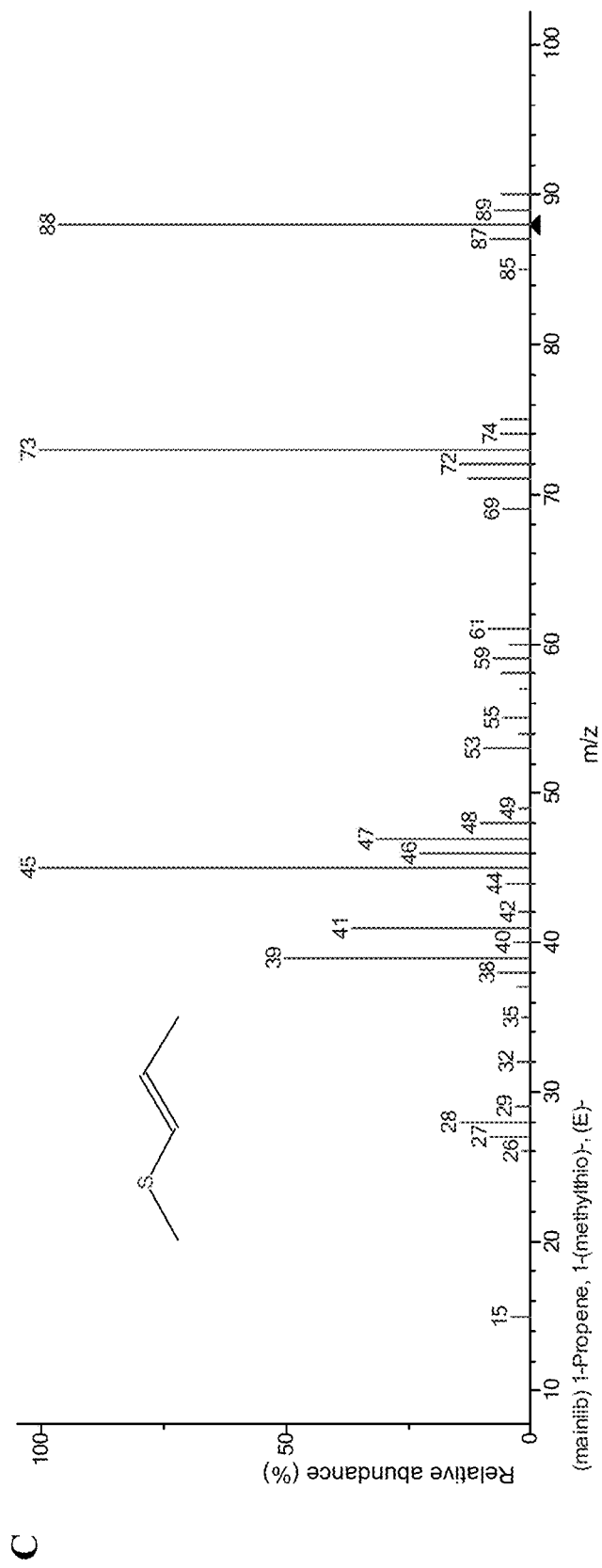
Figure 6:
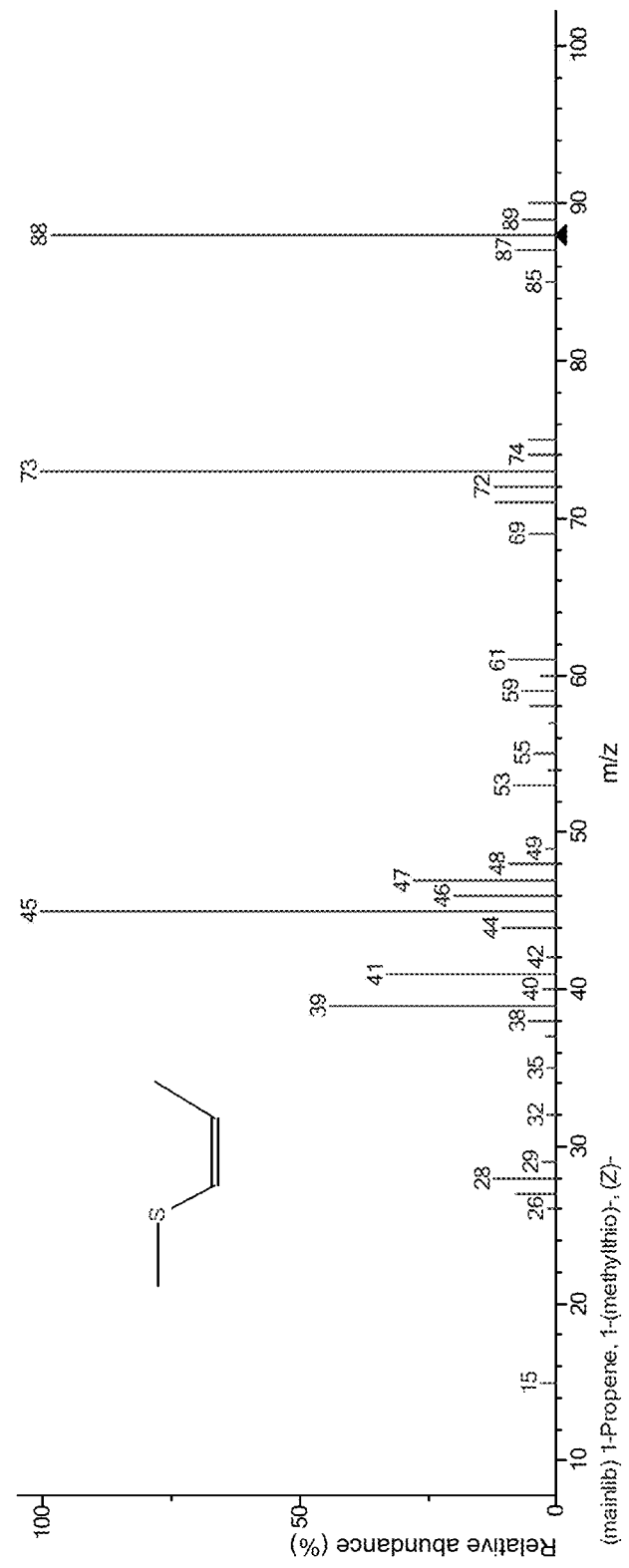

FIG. 6. Structure and ion fragmentation patterns of thioethers useful for the invention.

Figure 7:
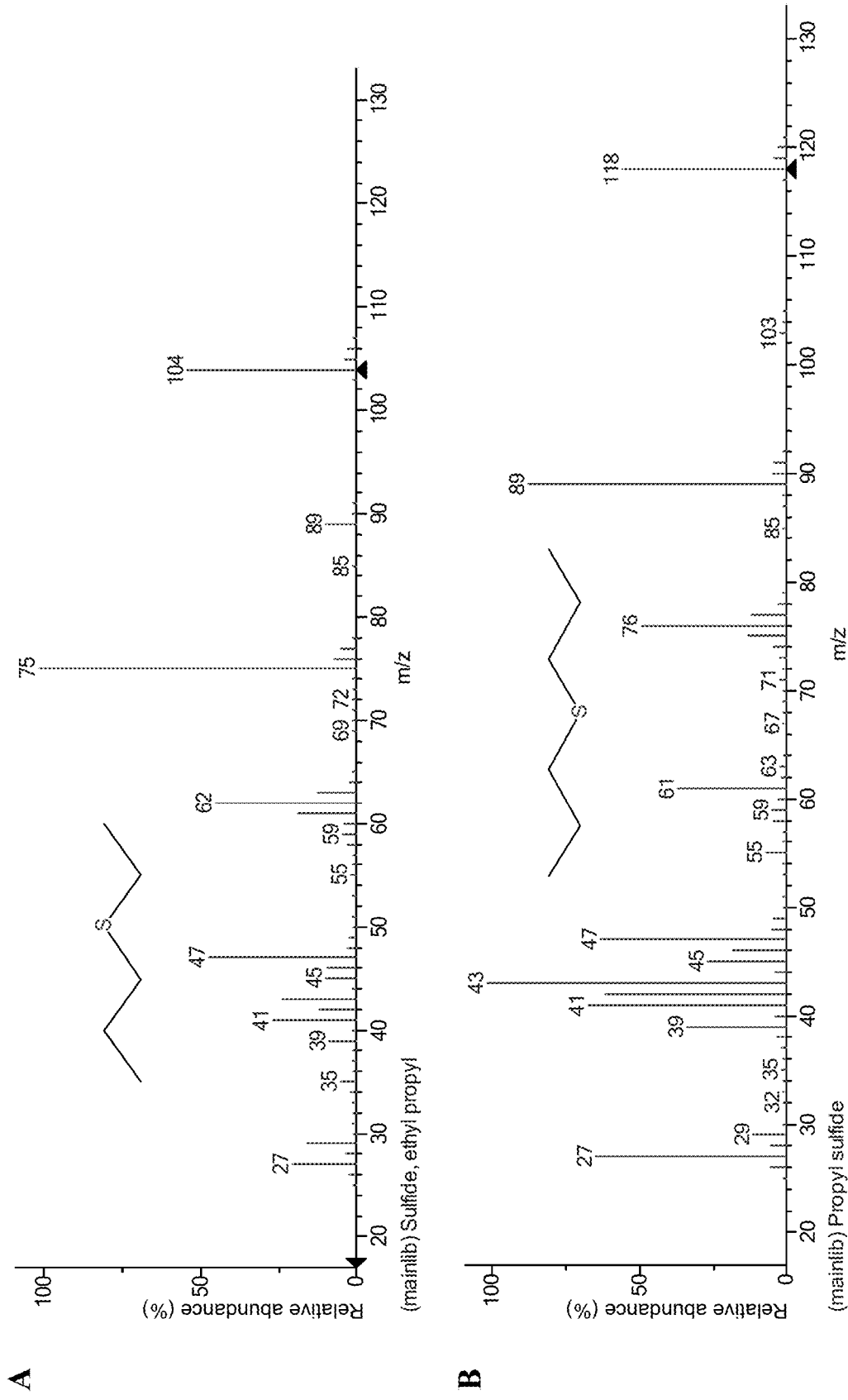
Figure 7:
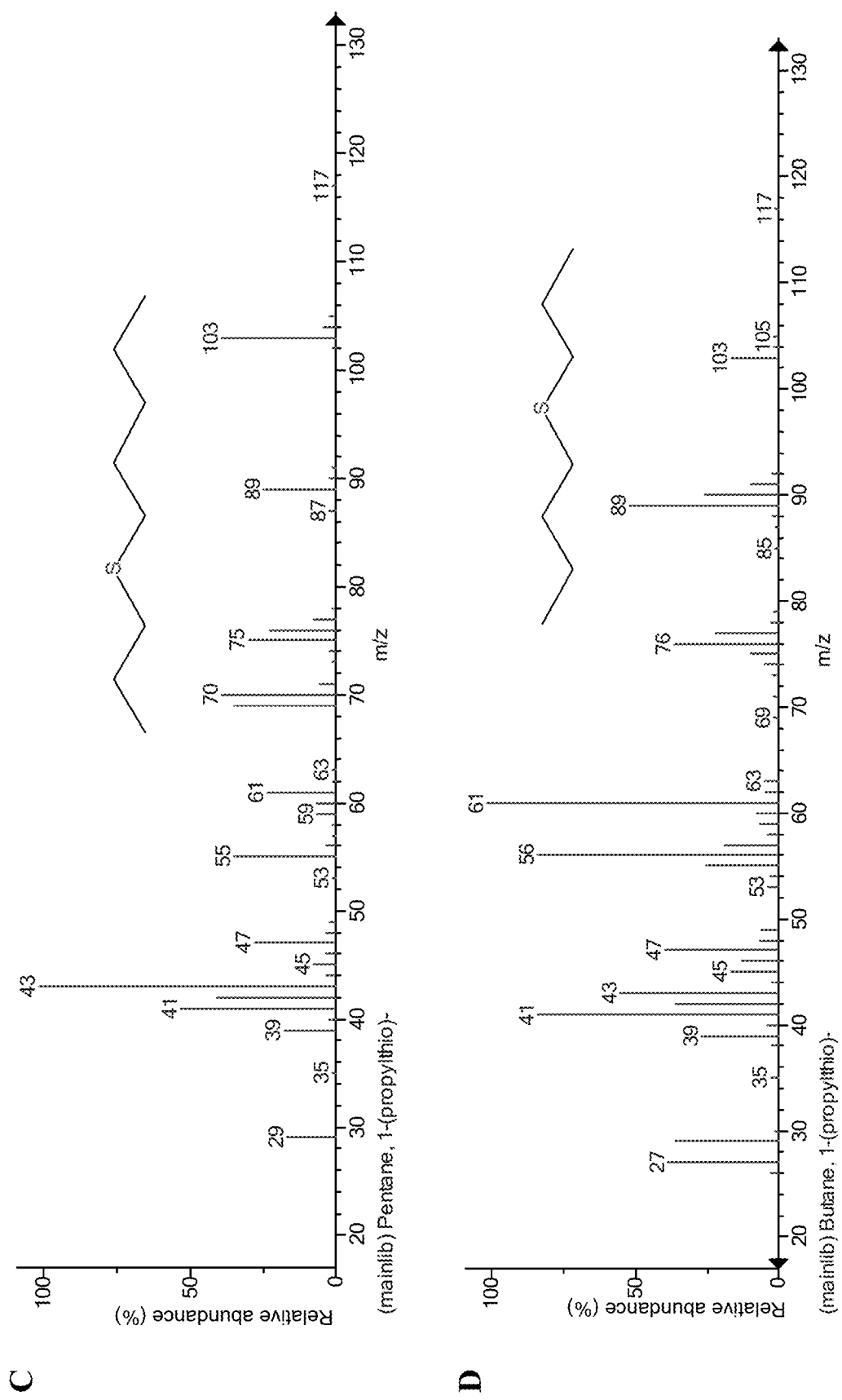
Figure 7:
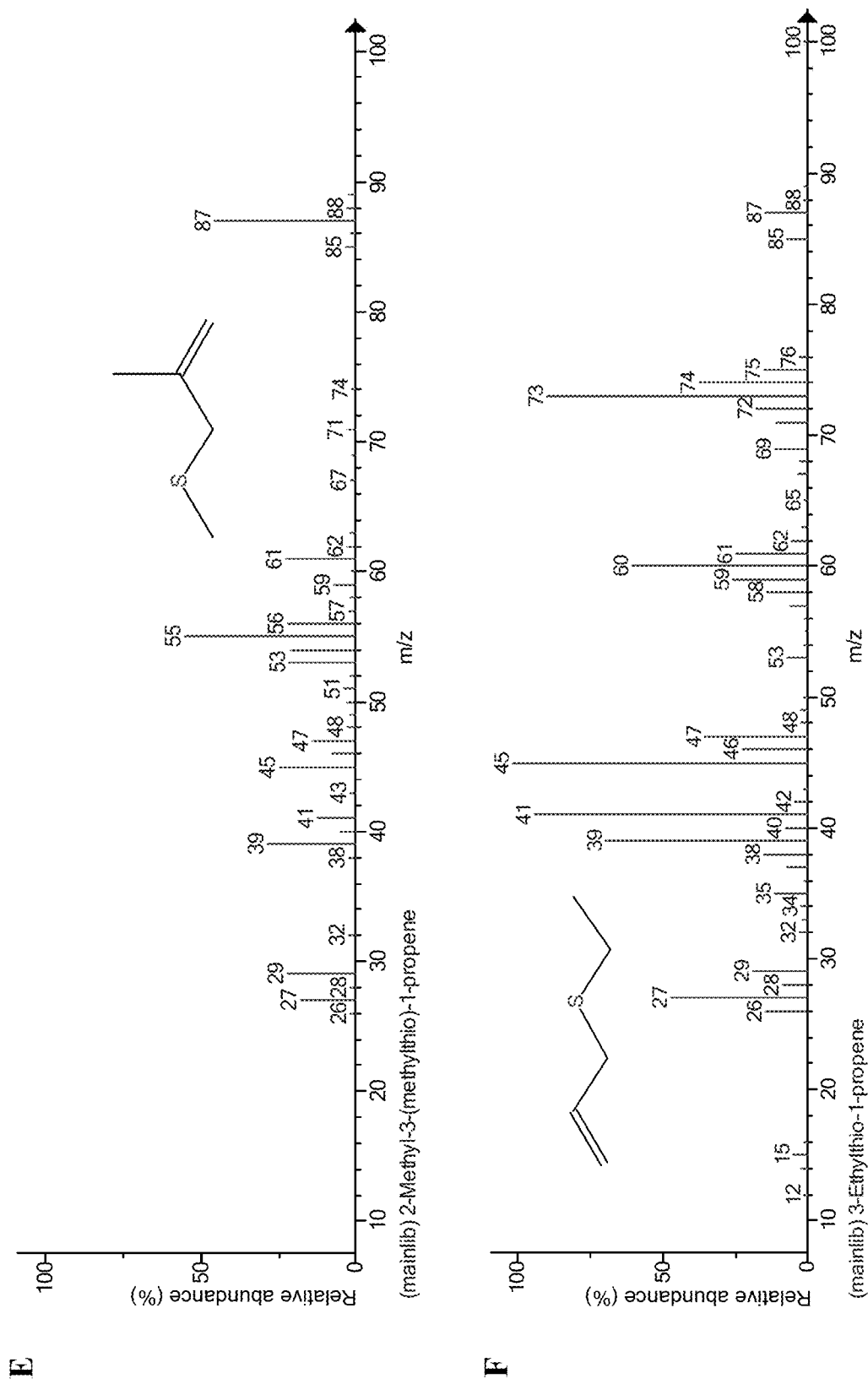
Figure 7:
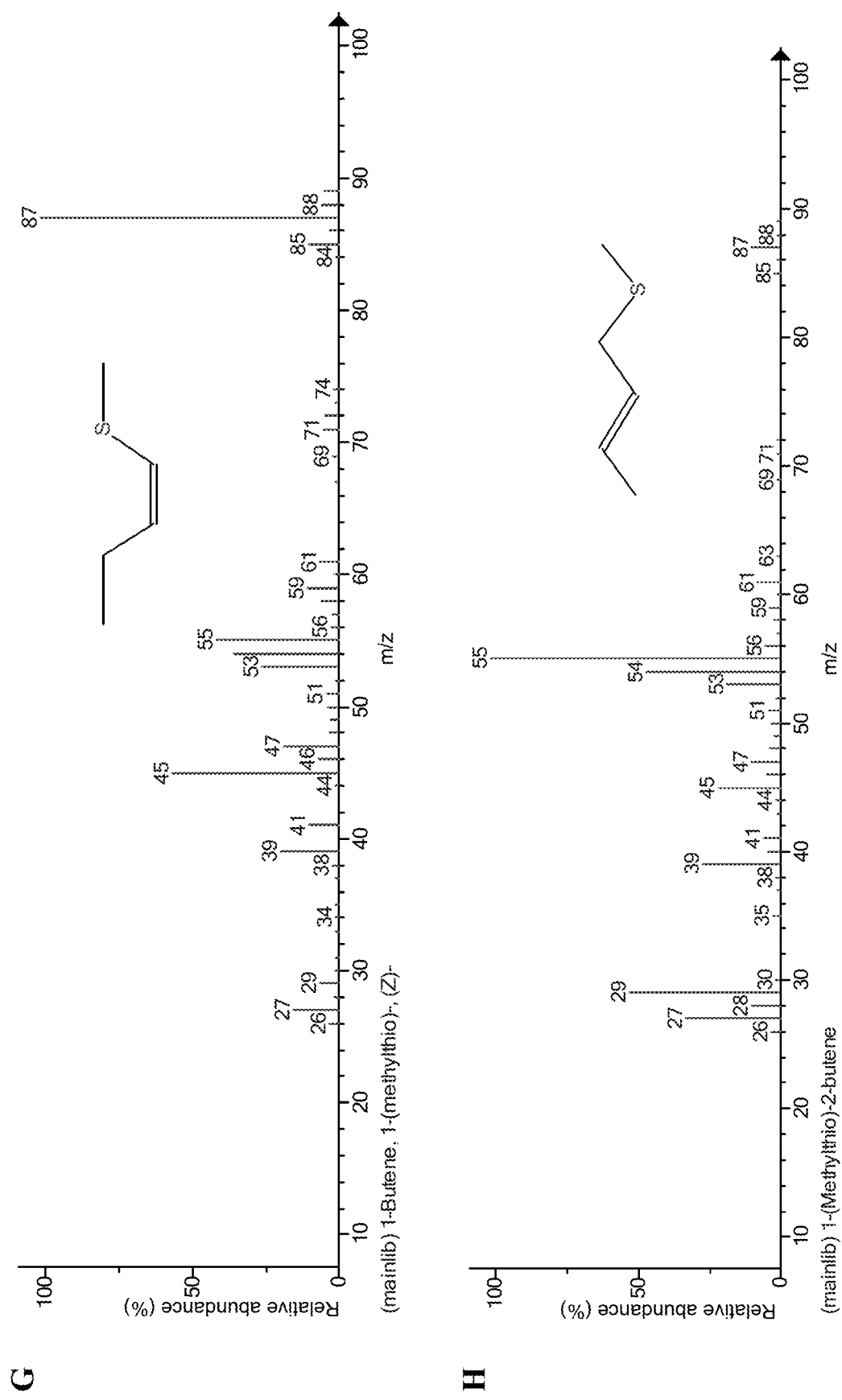
Figure 7:
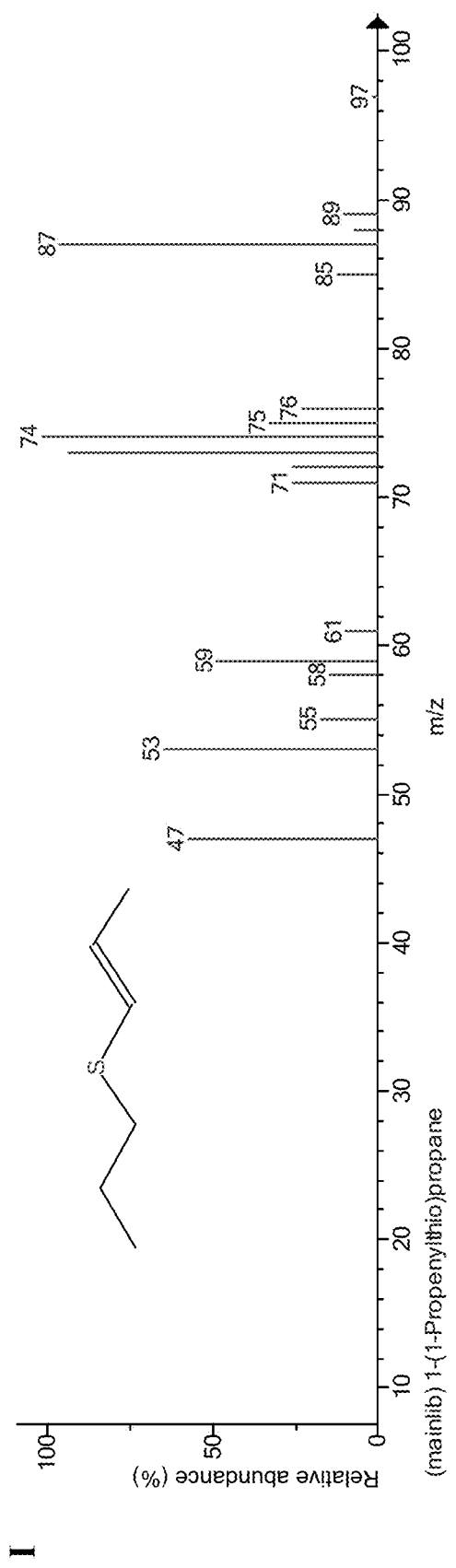

FIG. 7. Structure and ion fragmentation patterns of thioesters useful for the invention.

Figure 8:
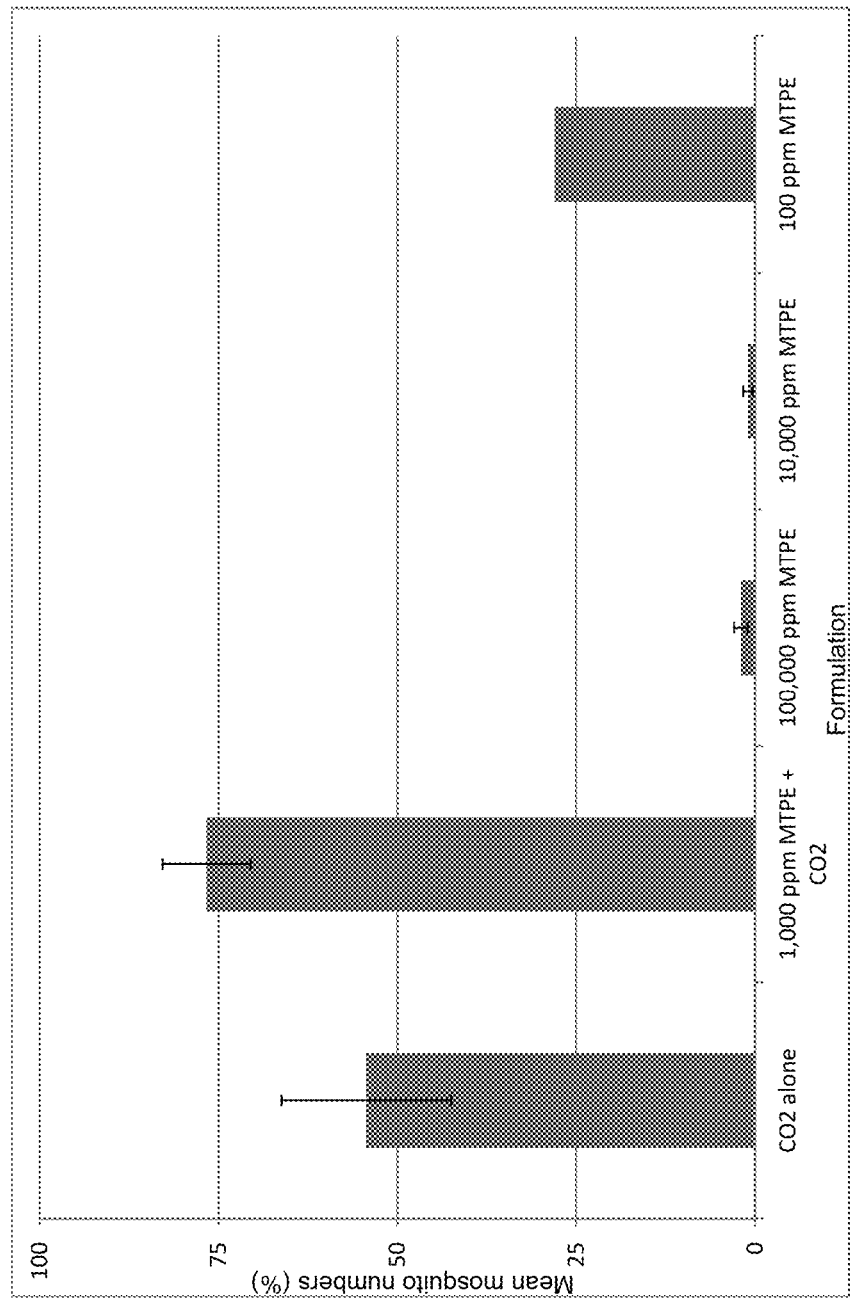

FIG. 8. Attractancy of MTPE+/−$CO_2$ based on mean mosquito numbers.

Figure 9:
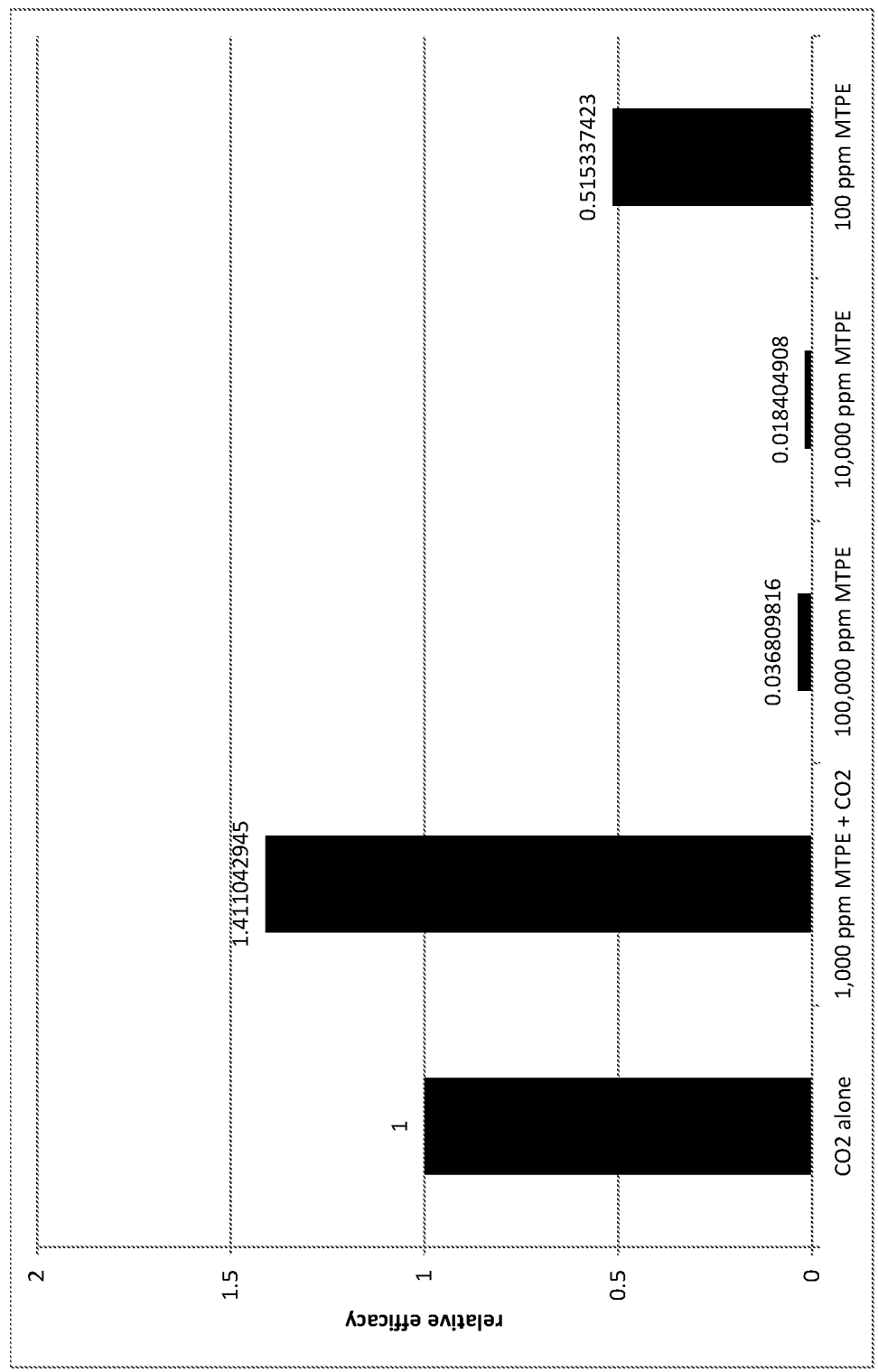

FIG. 9. Attractancy ratio of MTPE+/−$CO_2$ in comparison to $CO_2$ standard.

Figure 10:
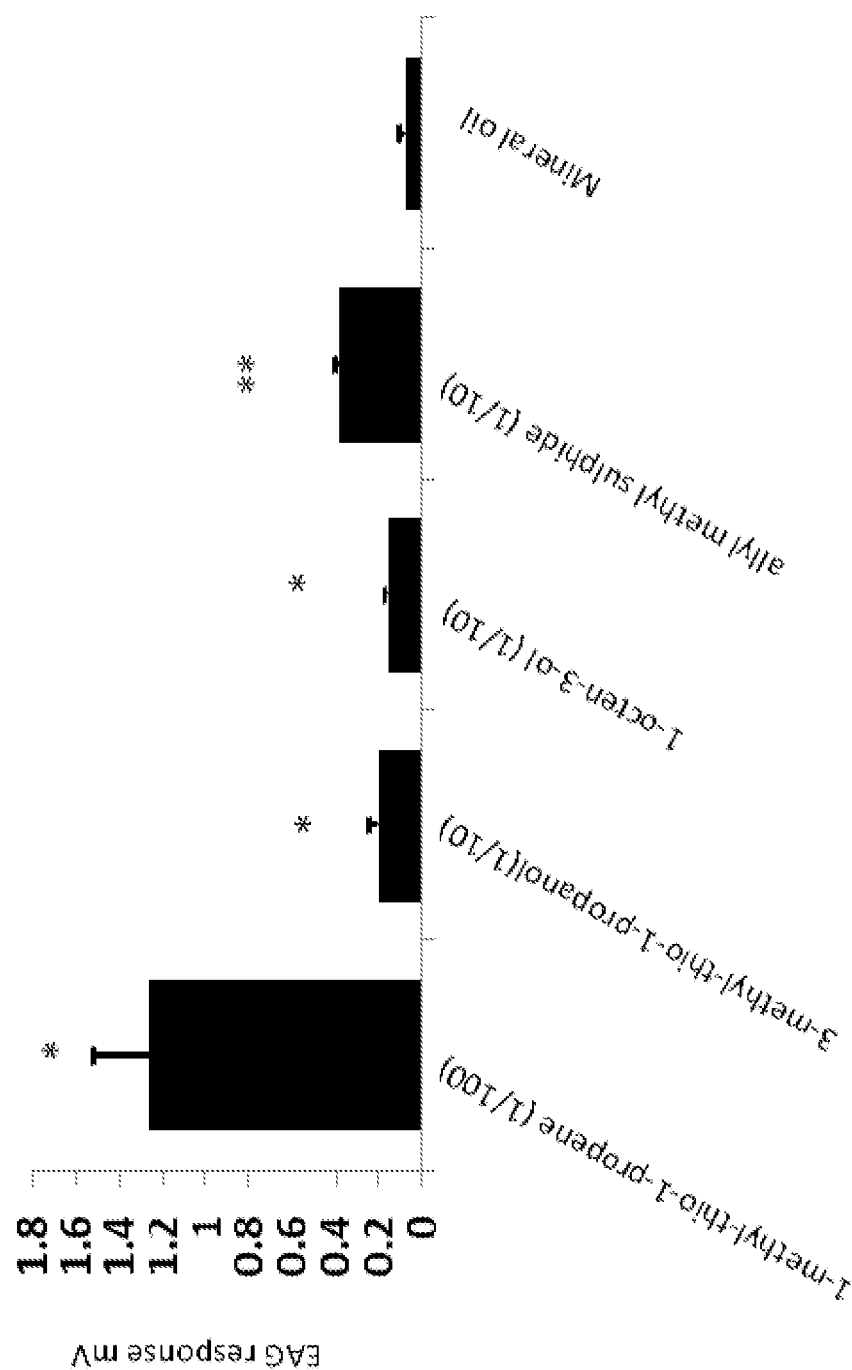

FIG. 10. Electrophysiological response of *Anopheles stephensi* non bloodfed females. EAG responses (n=6) All chemicals tested at 1/10 concentrations, $CO_2$ 5%. * $p<0.05$, ** $p<0.01$ t-test compared to mineral oil control.

Figure 11:
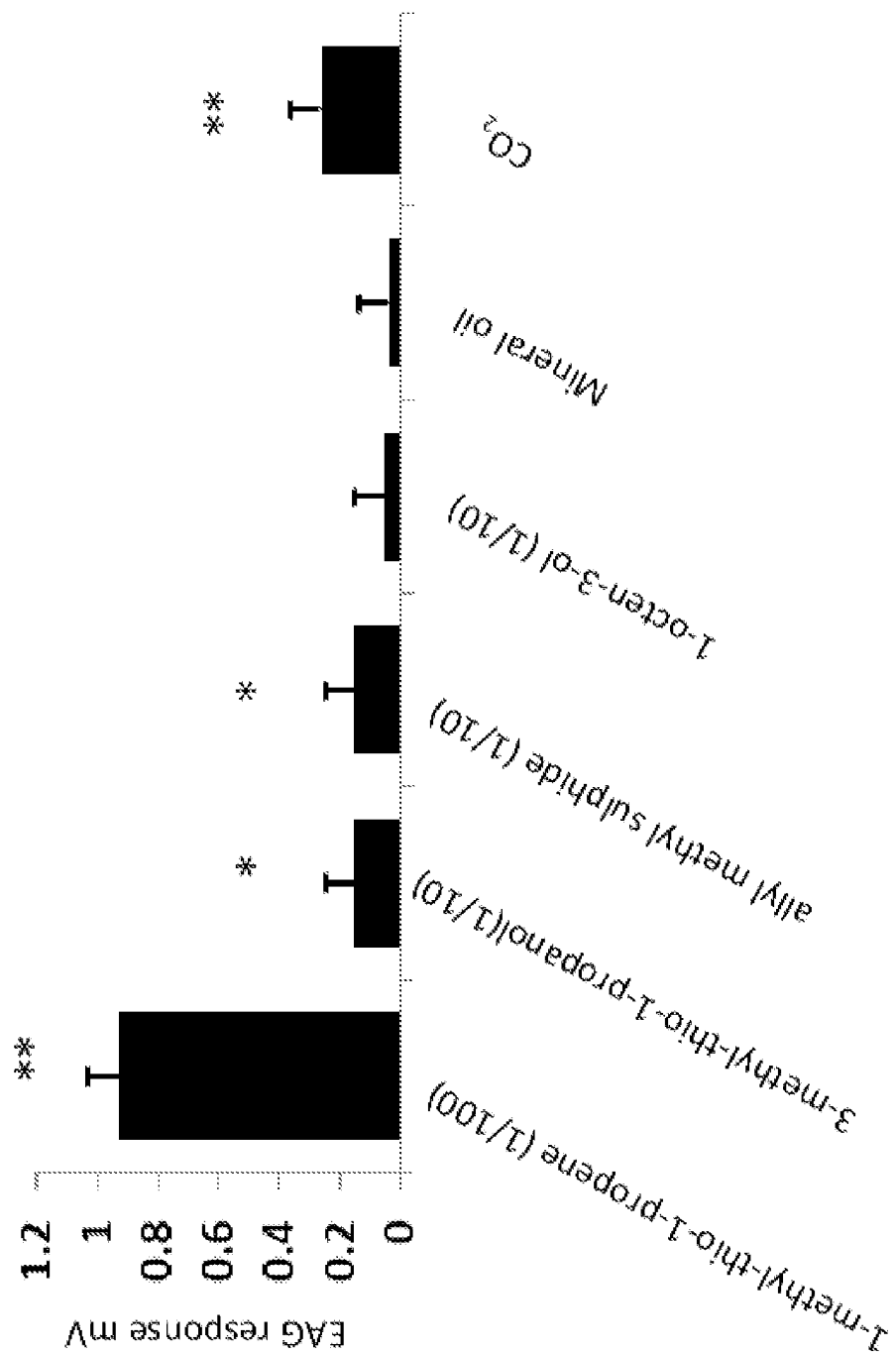

FIG. 11. Electrophysiological response of *Anopheles stephensi* non bloodfed females EPG responses (n=7). All chemicals tested at 1/10 concentrations, $CO_2$ 5%. * $p<0.05$, ** $p<0.01$ t-test compared to mineral oil control.

Figure 12:
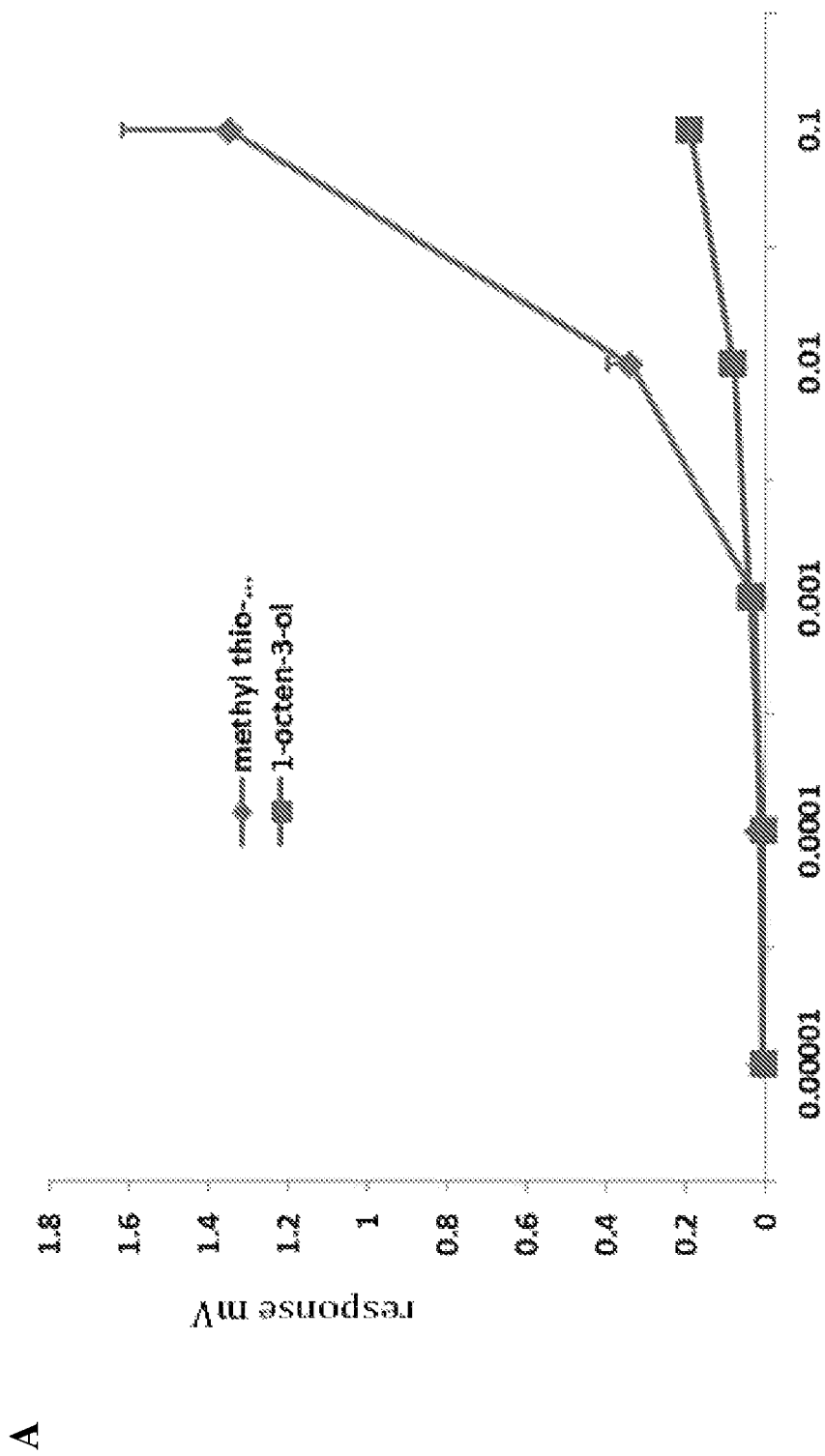
Figure 12:
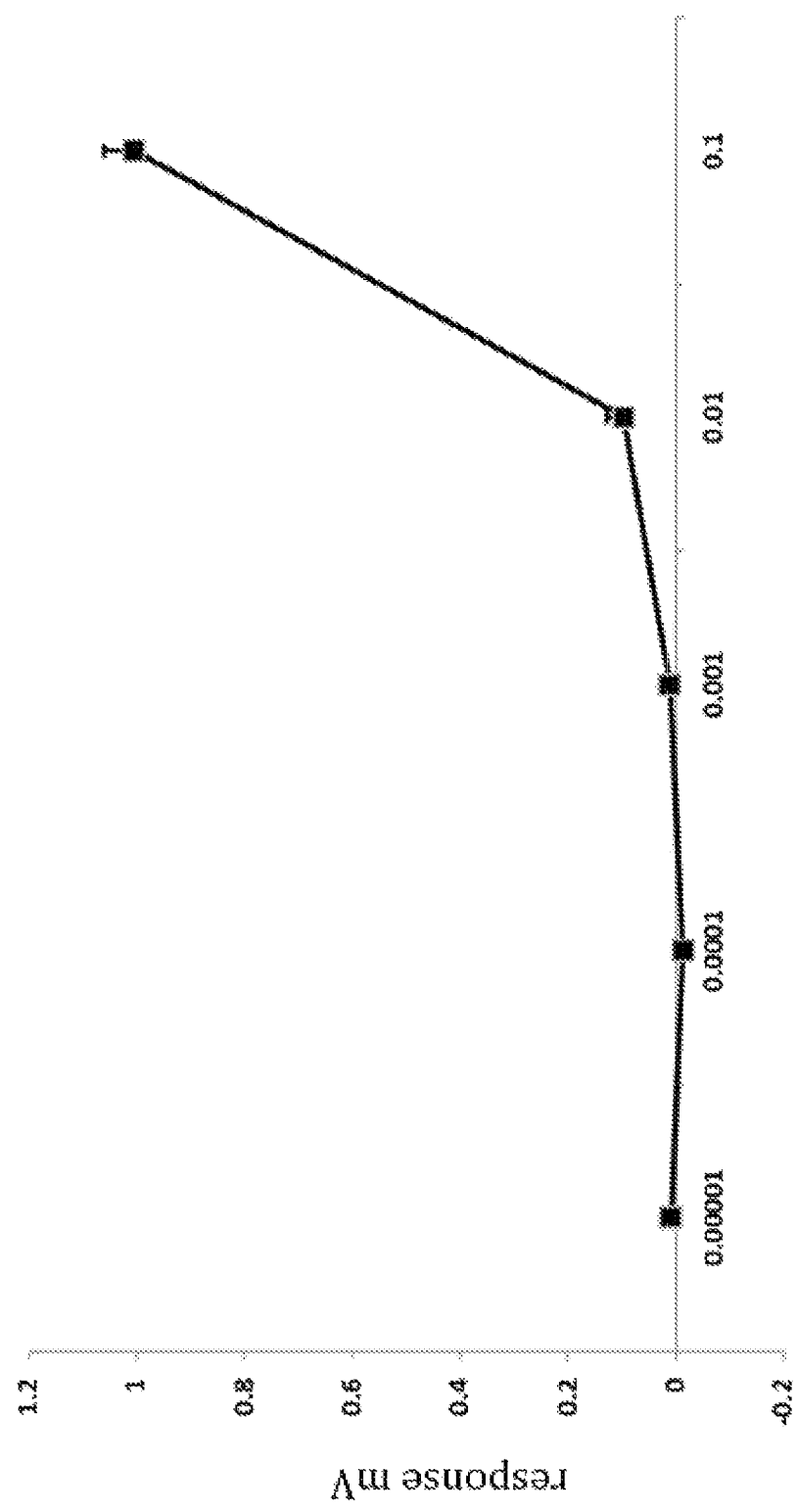

FIG. 12. Dose dependent response of *Anopheles stephensi* non bloodfed females a) EAG dose response for 1-methylthio-1-propene (diamond) and 1-octen-3-ol (square) (n=7). b) EPG dose response for 1-methylthio-1-propene (n=6).

Figure 13:
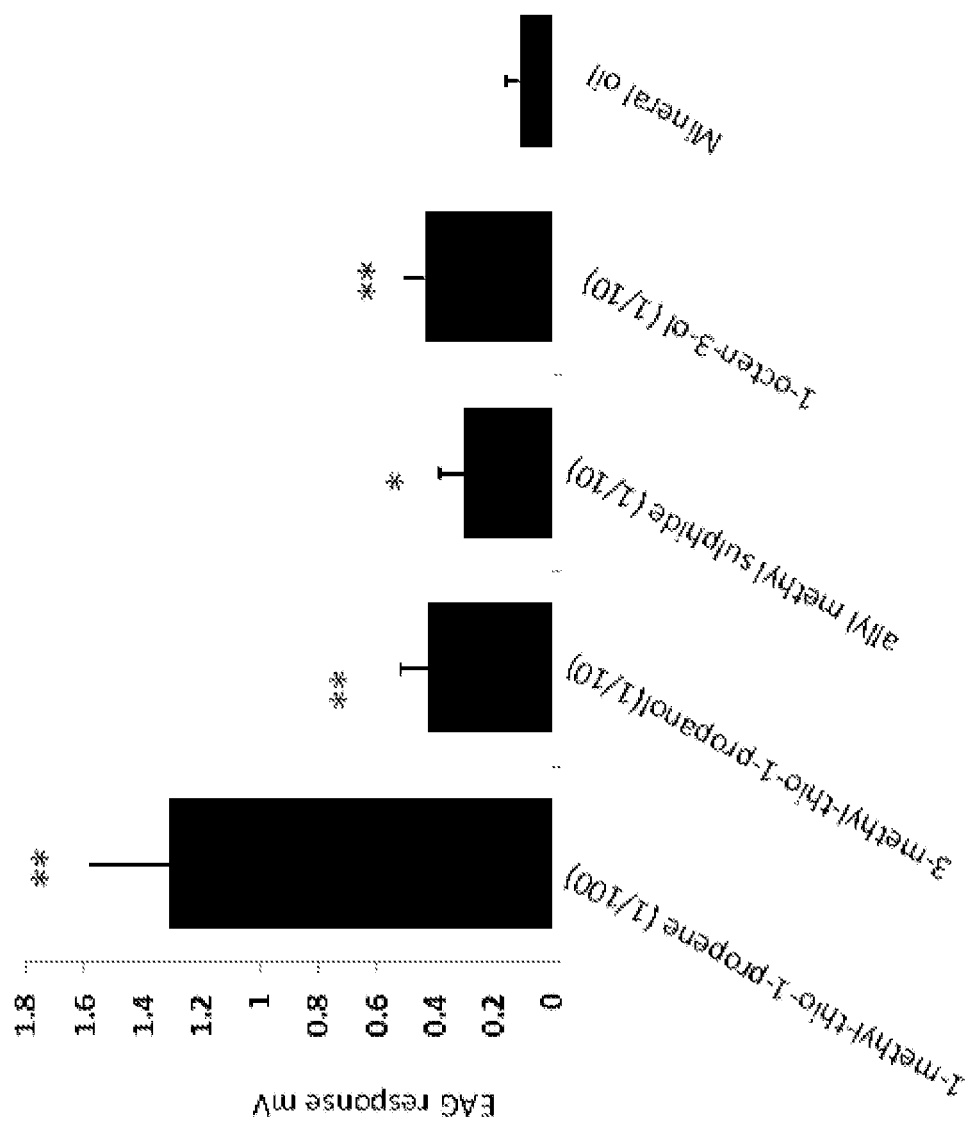

FIG. 13. Electrophysiological response of *Anopheles farauti* non bloodfed females. EAG responses (n=5). All chemicals tested at 1/10 concentrations, $CO_2$ 5%. * $p<0.05$, ** $p<0.01$ t-test compared to mineral oil control.

Figure 14:
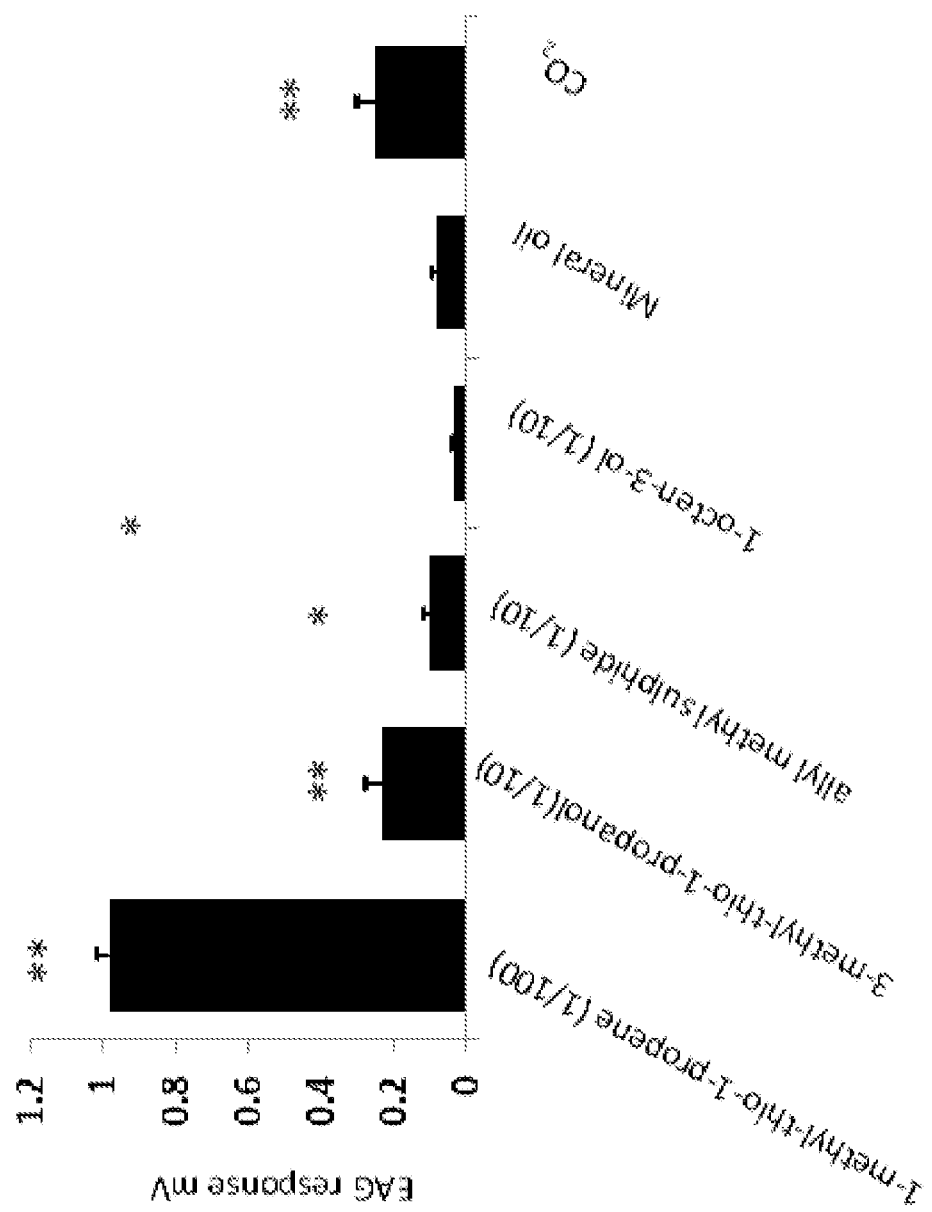

FIG. 14. Electrophysiological response of *Anopheles farauti* non bloodfed females. EPG responses (n=6). All chemicals tested at 1/10 concentrations, $CO_2$ 5%. * $p<0.05$, ** $p<0.01$ t-test compared to mineral oil control.

Figure 15:
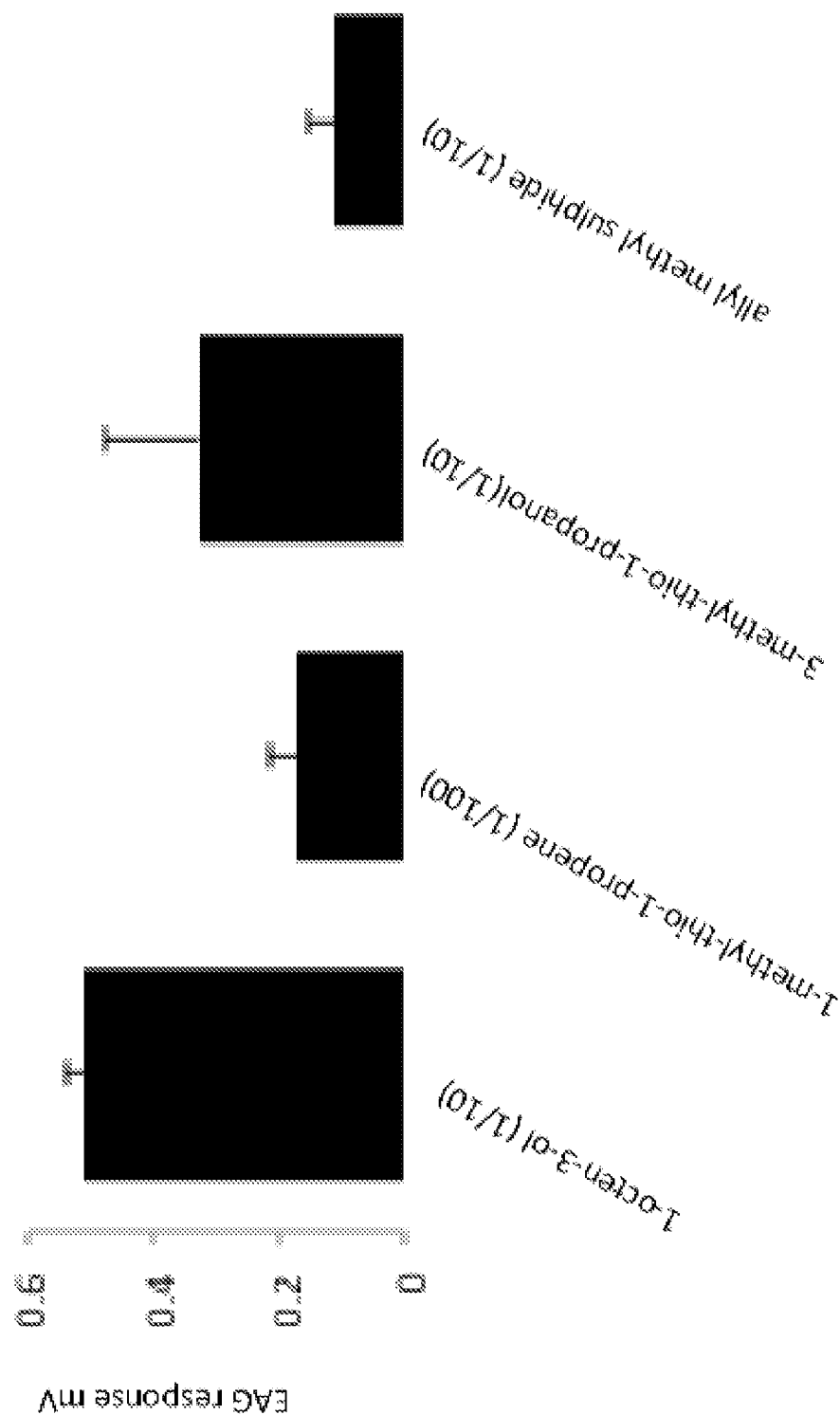

FIG. 15. EAG response of *C. annulirostris* non bloodfed females (n=5).

Figure 16:
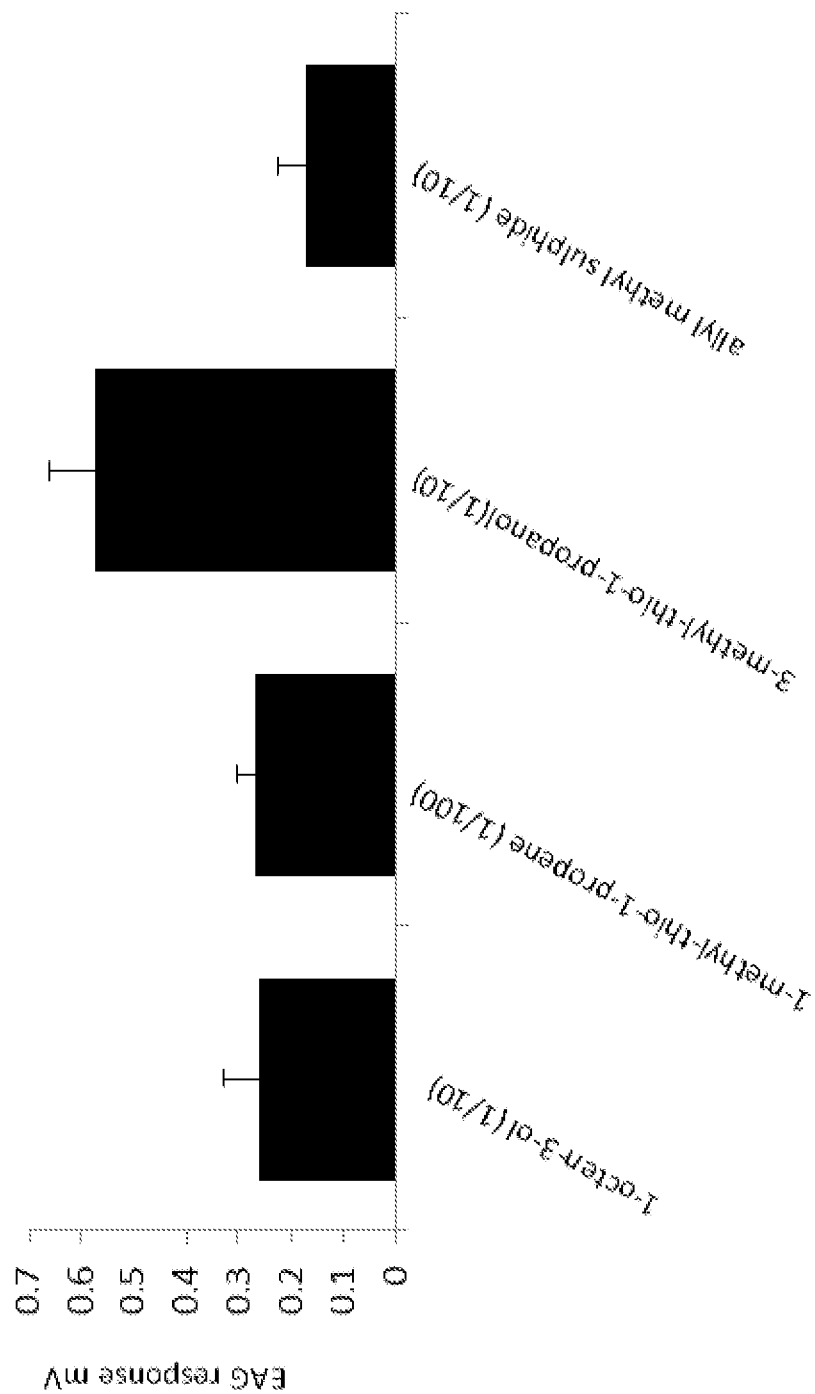

FIG. 16. EAG response of *A. aegypti* non bloodfed females (n=5).

DETAILED DESCRIPTION OF THE INVENTION

General Techniques and Selected Definitions

Unless specifically defined otherwise, all technical and scientific terms used herein shall be taken to have the same meaning as commonly understood by one of ordinary skill in the art (e.g., physiology, organic chemistry, biochemistry, insect formulations, insect trap design and mosquito behaviour).

As understood in the art the use of "E" and "Z" in reference to 1-methylthio-1-propene (MTPE) is the notation used to describe the geometric isomerism, or stereochemistry, of the double bond in 1-methylthio-1-propene. Thus, it is envisaged that reference to MTPE in the present invention encompasses the E enantiomer, Z enantiomer or a mixture thereof.

As will be understood, an "aromatic" group means a cyclic group having 4m+2 π electrons, where m is an integer equal to or greater than 1. As used herein, "aromatic" is used interchangeably with "aryl" to refer to an aromatic group, regardless of the valency of aromatic group. A heteroaromatic group is an aromatic group or ring containing one or more heteroatoms, such as N, O, S, Se, Si or P. As used herein, "heteroaromatic" is used interchangeably with "heteroaryl".

"Aryl" whether used alone, or in compound words such as arylalkyl, aryloxy or arylthio, represents an optionally substituted aromatic carbocyclic moiety.

"Heterocyclyl" or "heterocyclic" whether used alone, or in compound words such as heterocyclyloxy represents an optionally substituted carbocyclic group, in which one or more of the carbon ring atoms has been replaced by element(s) other than carbon, for example nitrogen, oxygen, sulfur or silicon. The term heterocyclyl encompasses heteroaryl.

"Heteroaryl" whether used alone, or in compound words such as heteroaryloxy represents an optionally substituted aromatic organic moiety, in which one or more of the ring members is/are element(s) other than carbon, for example nitrogen, oxygen, sulfur or silicon; the heteroatom(s) interrupting a carbocyclic ring structure and having a sufficient number of delocalized π electrons to provide aromatic character, provided that the rings do not contain adjacent oxygen and/or sulfur atoms.

The term "optionally substituted" means that a functional group is either substituted or unsubstituted, at any available position.

The term "halo" or "halogen" whether employed alone or in compound words such as haloalkyl, haloalkoxy or haloalkylsulfonyl, represents fluorine, chlorine, bromine or iodine. Further, when used in compound words such as haloalkyl, haloalkoxy or haloalkylsulfonyl, the alkyl may be partially halogenated or fully substituted with halogen atoms which may be independently the same or different. Examples of haloalkyl include, without limitation, —$CH_2CH_2F$, —$CF_2CF_3$ and —$CH_2CHFCl$.

"Alkyl" whether used alone, or in compound words such as alkoxy, alkylthio, alkylamino, dialkylamino or haloalkyl, represents a monovalent straight or branched chain hydrocarbons group. Thus alkyl moieties include, for example, methyl, ethyl, n-propyl, iso-propyl and/or butyl, pentyl and hexyl.

"Alkenyl" whether used alone, or in compound words such as alkenyloxy or haloalkenyl, represents monovalent straight or branched chain hydrocarbons groups containing at least one carbon-carbon double bond, including, ethylene, 1-propenyl, 2-propenyl, and/or butenyl, pentenyl and hexenyl.

"Alkynyl" whether used alone, or in compound words such as alkynyloxy, represents monovalent straight or branched chain hydrocarbons groups containing at least one carbon-carbon triple bond, including, ethynyl, 1-propynyl, 2-propynyl, and/or butynyl, pentynyl and hexynyl.

"Cycloalkyl" represents a carbocyclic ring system, e.g., cyclopropyl, cyclobutyl, cyclopentyl, or cyclohexyl.

"Alkylene" represents a bivalent straight or branched chain saturated hydrocarbon group.

"Alkenylene" represents a bivalent straight or branched chain unsaturated hydrocarbon with at least one carbon-carbon double bond.

"Alkynylene" represents a bivalent straight or branched chain unsaturated hydrocarbon with at least one carbon-carbon triple bond.

"Carboxyl" represents a —C(=O)OH moiety.

"Alkylaminocarbonyl" represents a —C(=O)NHR or —C(=O)NRR' group in which R and R' is an alkyl group as defined supra.

"Cyano" represents a —CN moiety.

"Hydroxyl" represents a —OH moiety.

"Alkoxy" represents an —O-alkyl group in which the alkyl group is as defined supra. Examples include methoxy, ethoxy, n-propoxy, iso-propoxy, and the different butoxy, pentoxy, hexyloxy and higher isomers.

"Alkenyloxy" represents an —O-alkenyl group in which the alkenyl group is as defined supra. An example is allyloxy.

"Amino" represents an —$NH_2$ moiety.

"Alkylamino" represents an —NHR or —NRR' group in which R and R' is an alkyl group as defined supra. Examples include, without limitation, methylamino, ethylamino, n-propylamino, isopropylamino, and the different butylamino, pentylamino and hexylamino.

As used in this specification and the appended claims, terms in the singular and the singular forms "a," "an" and "the," for example, optionally include plural referents unless the content clearly dictates otherwise. Thus, for example, reference to "a thio compound" optionally includes a plurality of thio compounds.

As used herein, the term "about", unless stated to the contrary, refers to +/−10%, more preferably +/−5%, more preferably +/−1%, of the designated value.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Mosquito Behaviour

Formulations of the invention are able to activate a mosquito. The terms "activate", "activating", "activator" and variations thereof as used in the context of the present invention relate to a formulation that generates a response, such as being one or more of excited, confused, irritated, fight, attracted or repelled, by a mosquito. In an example, the presence of a formulation of the invention, or a thio compound released therefrom, reduces the likelihood a subject, such as a human subject with a *Plasmodium* infection, will be bitten by a mosquito.

Thus, thio compounds released from, or present in, formulations of the present invention can affect mosquito behaviour in at least three different ways, namely "attractants" that pull mosquitoes towards a particular position such as into a trap placed away from humans, "repellents" that push mosquitoes away from a particular position and "maskers" that block attraction to humans.

The terms "repellent" and "attractant" are used in the context of the present invention to refer to a formulation that generates a directional response in mosquitoes. In an example, the formulations of the present invention can act as a mosquito "attractant". In another example, the formulations of the present invention can act as a mosquito "repellent". In an embodiment, higher concentrations of the thio compound may result in mosquitoes being repelled.

Mosquito attraction or repulsion is not initiated without mosquito activation. Thus, it is envisaged that the terms "attractant" and "repellent" as used in the context of the present invention also encompass "activator". However, mosquito "activation" can occur without "attraction" or "repulsion". Thus, in an example, an "activator" does not encompass an "attractant" or "repellent".

In another example, the formulations of the present invention can act as a mosquito "masker". In other examples, the formulations of the present invention can act as arrestants that cause mosquitoes to stay at a site longer and/or as stimulants that cause mosquitoes to oviposition, i.e., lay eggs, or to lay more eggs at a single site.

Methods of determining whether formulations of the present invention, for example different concentrations of the thio compounds, act as activators, attractants or repellents are exemplified below. These methods can be easily adapted to determine whether formulations of the present invention act as arrestants or stimulants. Various other suitable methods are known in the art. For example, previously described olfactory- and contact-mediated bioassays (Trexler, J. et al., "Laboratory and Field Evaluations of Oviposition Responses of *Aedes albopictus* and *Aedes triseriatus* (Diptera: Culicidae) to Oak Leaf Infusions", J. Med. Entomol., 35(6): 967-976 (1998), Dekker, T. et al., "L-lactic acid: a human-signifying host cue for the anthropophilic mosquito *Anopheles gambiae*", Medical and Veterinary Entomology, 16: 91-98 (2002), and WO2003/103395) or variations thereof may be used. In an example, two cups (test and control) are placed randomly in diagonal corners of a suitable cage. Each cup releases or is filled with either test or control formulation.

For olfactory bioassays, a mesh screen covered with insect glue can be placed above test and control cups. Positive or negative responses to test formulations can be measured by the numbers of mosquitoes trapped on the sticky screen during an exposure period (e.g. 24 hr).

For egg-laying bioassays, cups are filled with solution and gravid females are released in each replicate cage. After an exposure period (e.g. 24 hr), eggs laid on the surface of the solution in test and control cups are counted.

In another example, mosquitoes can be visually assessed following exposure to test and control formulations with mosquito activation being measured by counting the number of mosquitoes which take flight following exposure. Mosquito activation/repulsion can also be visually assessed to determine whether a test formulation initiates an attractive or repulsive directional response in mosquitoes.

In other examples, assays can also be performed in a semi-field tunnel or in an outdoor field setting (see, for example, Lorenz, L. et al., "Taxis assays measure directional movement of mosquitoes to olfactory cues", Parasites & Vectors, 6(131): 1-12 (2013).); Ritchie, S. et al., "Confusion, knock-down and kill of *Aedes aegypti* using metofluthrin in domestic settings: a powerful tool to prevent dengue transmission?", Parasites & Vectors, 6(262): 1-12 (2013) and Devine, 2013).

The ability of formulations to mask a subject can be assessed by exposing a test subject to mosquitoes in the presence of test and control formulations for a period of time and then recording the number of bites received by the subject.

Thio Compounds

The present inventors have found that thio compounds are useful for activating mosquitoes. In an example, the thio compound is a thioether. In an example, the present invention encompasses any thio compound (e.g. thioether) that can activate mosquitoes.

In an example, the thio compound (e.g. thioether) is a "volatile organic compound". The term "volatile organic compound", which may also be abbreviated to "VOC", refers to compounds that have a high vapor pressure at ambient temperature (e.g. about 20° C. or about 25° C.). The high vapor pressure of VOCs results from a low boiling point, which causes large numbers of molecules to evaporate or sublimate from a liquid or solid form of the compound into a gaseous state (i.e. volatisation).

Thus, in an example, thio compounds can have vapor pressure ranging from as low as about 10 Pa to about 300 kPa at 20° C. In an example, thio compounds have vapor pressure ranging from about 50 Pa to about 200 kPa, about 70 Pa to about 175 kPa, about 100 Pa to about 150 kPa, about 200 Pa to about 100 kPa, about 300 Pa to about 90 kPa, about 400 Pa to about 80 kPa, about 500 Pa to about 70 kPa, about 600 Pa to about 60 kPa, about 700 Pa to about 50 kPa, about 800 Pa to about 40 kPa, about 900 Pa to about 30 kPa, about 1 kPa to about 20 kPa, about 5 kPa to about 150 kPa, about 10 kPa at 20° C. For example, thio compounds can have vapor pressure of about 9 kPA such as for example, 9.1 kPA at 25° C.

In another example, thio compounds can have a boiling point of less than 100° C., less than 90° C., less than 80° C., less than 70° C., less than 60° C., less than 50° C. or less. "Volatile organic compounds" can be present in solid, liquid and gaseous formulations. Such formulations are discussed below. In an example, the thio compounds are "volatised" upon release from these formulations (i.e. the thio compound is varporised upon release from a solid or liquid).

Thio compounds with lower volatility may be preferred for slow release formulations. In an example, thio compounds having a vapor pressure of about 50 Pa to about 100 kPa, about 200 Pa to about 90 kPa, about 400 Pa to about 80 kPa, about 600 Pa to about 70 kPa, about 800 Pa to about 60 kPa, about 1 kPa to about 50 kPa, about 2 kPa to about 40 kPa, about 5 kPa to about 30 kPa, about 10 kPa to about 20 kPa, about 12 kPa to about 15 kPa at 20° C. are used for slow release formulations.

The present inventors have identified that various thio compounds isolated from breath can activate and attract mosquitoes. Thus, in an example, the present invention encompasses a thio compound present in the breath of a human or animal. In an example, the thio compound is present in the breath of a human. Exemplary thio compounds found in breath are shown in Table 1.

TABLE 1

Exemplary thio compounds found in breath

| CAS-number | Compound name |
| --- | --- |
| 10152-76-8 | allyl methylsulfide |
| 95-16-9 | 1,3-benzothiazole |
| 75-18-3 | dimethylsulfide/thiopropane |
| 1534-08-3 | ethanethioic acid, S-methyl ester |
| 624-89-5 | ethylmethylsulfide |
| 24050-09-7 | 2-ethyl-1,3-thiazolidine |
| 872-55-9 | 2-ethylthiophene |
| 5454-45-5 | 3-(ethylthio)propanal |
| 3581-87-1 | 2-methylthiazole |
| 554-14-3 | 2-methylthiophene |
| 616-44-4 | 3-methylthiophene |
| 3877-15-4 | 1-(methylthio)-propane |
| 42848-06-6 | 1-(methylthio)-1-propene, (1E)- |
| 52195-40-1 | 1-(methylthio)-1-propene, (Z)- |
| 1072-43-1 | propylenesulfide |
| 288-47-1 | 1,3-thiazole |
| 110-02-1 | thiophene |

In an example, the thio compound is present in the breath of a human or animal bitten by a mosquito.

In an example, the thio compound is present in the breath of a human or animal infected with a disease. For example, the human or animal may be infected with malaria. In an example, the thio compound is present in the breath of a human or animal infected with a malaria parasite from the genus *Plasmodium*. For example, a human may be infected with any one of the above referenced *Plasmodium* species. For example, the *Plasmodium* species may be *Plasmodium falciparum*.

In an example, the thio compound is a thioether. In an example, the thio compound is a thioether represented by the following Formula 1:

Formula 1 wherein R1 and R2 are substituents that may be the same or different, and are each independently selected from the group consisting of an optionally substituted alkyl group, an optionally substituted alkenyl group, an optionally substituted alkynyl group, an optionally substituted cycloalkyl group, an optionally substituted aryl group, and an optionally substituted heterocyclic group.

In an example of the compound of Formula 1, R1 and R2 are independently selected from an optionally substituted $C_{1-6}$alkyl, an optionally substituted $C_{2-6}$alkenyl, an optionally substituted $C_{2-6}$alkynyl, an optionally substituted $C_{1-6}$cycloalkyl, and an optionally substituted heterocyclic group.

In another example of the compound of Formula 1, R1 and R2 are independently selected from an optionally substituted $C_{1-6}$alkyl and an optionally substituted $C_{2-6}$alkenyl.

In another example of the compound of Formula 1, R1 and R2 are independently selected from an optionally substituted $C_{1-6}$alkyl and an optionally substituted $C_{2-6}$alkenyl, wherein when said $C_{1-6}$alkyl or $C_{2-6}$alkenyl is substituted, it is independently substituted with up to three substituents each independently selected from the group consisting of halo; hydroxyl; —CN; —$OC_{1-6}$alkyl; —$NH_2$; $NH(C_{1-6}$alkyl); $N(C_{1-6}$alkyl$)_2$; —$CONH_2$; phenyl optionally substituted with up to three substituents each independently selected from the group consisting of halo, hydroxyl, —CN, $C_{1-6}$alkyl, —$OC_{1-6}$alkyl, —$NH_2$, $NH(C_{1-6}$alkyl), $N(C_{1-6}$alkyl$)_2$; and 5- to 6-membered heterocyclyl optionally substituted with up to three substituents each independently selected from halo, hydroxyl, —CN, $C_{1-6}$alkyl, —$OC_{1-6}$alkyl, —$NH_2$, $NH(C_{1-6}$alkyl), $N(C_{1-6}$alkyl$)_2$.

In another example of the compound of Formula 1, R1 and R2 are independently selected from optionally substituted $C_{1-6}$alkyl and optionally substituted $C_{2-6}$alkenyl, wherein when said $C_{1-6}$alkyl or $C_{2-6}$alkenyl is substituted, it is independently substituted with up to three substituents each independently selected from the group consisting of halo; hydroxyl; —CN; —$OC_{1-6}$alkyl.

In another example of the compound of Formula 1, R1 and R2 are both $C_{1-6}$alkyl, each of said $C_{1-6}$alkyl being independently substituted with up to three substituents each independently selected from the group consisting of halo; hydroxyl; —CN; —$OC_{1-6}$alkyl; —$NH_2$; $NH(C_{1-6}$alkyl); $N(C_{1-6}$alkyl$)_2$; —$CONH_2$; phenyl optionally substituted up to three substituents each independently selected from the group consisting of halo, hydroxyl, —CN, $C_{1-6}$alkyl, —$OC_{1-6}$alkyl, —$NH_2$, $NH(C_{1-6}$alkyl), $N(C_{1-6}$alkyl$)_2$; and 5- to 6-membered heterocyclyl optionally substituted with up to three substituents each independently selected from halo, hydroxyl, —CN, $C_{1-6}$alkyl, —$OC_{1-6}$alkyl, —$NH_2$, $NH(C_{1-6}$alkyl), $N(C_{1-6}$alkyl$)_2$.

In another example of the compound of Formula 1, R1 and R2 are both $C_{1-6}$alkyl, each of said $C_{1-6}$alkyl being independently substituted with up to three substituents each independently selected from the group consisting of halo; hydroxyl; —CN; —$OC_{1-6}$alkyl.

In another example of the compound of Formula 1, R1 and R2 are both $C_{2-6}$alkenyl, each of said $C_{2-6}$alkenyl being independently substituted with up to three substituents each independently selected from the group consisting of halo; hydroxyl; —CN; —$OC_{1-6}$alkyl; —$NH_2$; $NH(C_{1-6}$alkyl); $N(C_{1-6}$alkyl$)_2$; —$CONH_2$; phenyl optionally substituted up to three substituents each independently selected from the group consisting of halo, hydroxyl, —CN, $C_{1-6}$alkyl, —$OC_{1-6}$alkyl, —$NH_2$, $NH(C_{1-6}$alkyl), $N(C_{1-6}$alkyl$)_2$; and 5- to 6-membered heterocyclyl optionally substituted with up to three substituents each independently selected from halo, hydroxyl, —CN, $C_{1-6}$alkyl, —$OC_{1-6}$alkyl, —$NH_2$, $NH(C_{1-6}$alkyl), $N(C_{1-6}$alkyl$)_2$.

In another example of the compound of Formula 1, R1 and R2 are both $C_{2-6}$alkenyl, each of said $C_{2-6}$alkenyl being independently substituted with up to three substituents each independently selected from the group consisting of halo; hydroxyl; —CN; —$OC_{1-6}$alkyl.

In another example of the compound of Formula 1, R1 and R2 are each independently unsubstituted $C_{1-6}$alkyl. In another example, R1 and R2 are each independently $C_{1-4}$ alkyl. In that example, R1 and R2 may each independently be, for example, methyl, ethyl or propyl. In another example, R1 and R2 are each independently unsubstituted $C_{2-6}$alkenyl. In another example, R1 and R2 are each independently $C_{2-4}$ alkenyl. In that example, R1 and R2 may each independently be, for example, allyl or 1-propenyl.

In another example of the compound of Formula 1, R1 is an unsubstituted $C_{1-6}$alkyl, for example, methyl, ethyl or propyl; and R2 is a $C_{1-6}$alkyl substituted by hydroxyl, for example, a hydroxypropyl moiety.

In another example of the compound of Formula 1, R1 is substituted $C_{1-6}$alkyl and R2 is substituted $C_{2-6}$alkenyl, said $C_{1-6}$alkyl and $C_{2-6}$alkenyl each being independently substituted with up to three substituents each independently selected from the group consisting of halo; hydroxyl; —CN; —$OC_{1-6}$alkyl; —$NH_2$; $NH(C_{1-6}$alkyl); $N(C_{1-6}$alkyl$)_2$; —$CONH_2$; phenyl optionally substituted up to three substituents each independently selected from the group consisting of halo, hydroxyl, —CN, $C_{1-6}$alkyl, —$OC_{1-6}$alkyl, —$NH_2$, $NH(C_{1-6}$alkyl), $N(C_{1-6}$alkyl$)_2$; and 5- to 6-membered heterocyclyl optionally substituted with up to three substituents each independently selected from halo, hydroxyl, —CN, $C_{1-6}$alkyl, —$OC_{1-6}$alkyl, —$NH_2$, $NH(C_{1-6}$alkyl), $N(C_{1-6}$alkyl$)_2$.

In another example of the compound of Formula 1, R1 and R2 are independently selected from an unsubstituted $C_{1-6}$alkyl, an unsubstituted $C_{2-6}$alkenyl and a $C_{1-6}$alkyl substituted with a hydroxyl group.

In an example of the compound of Formula 1, the thioether is the mixture of the E and Z stereoisomers of 1-methylthio-1-propene (MTPE). In another example, the thioether is allyl methyl sulphide (AMS). In another example, the thioether is 3-methylthio-1-propanol (MTPL). For example, the thioether can be the E enantiomer of 1-methylthio-1-propene or the Z enantiomer of 1-methylthio-1-propene. In another example, the thioether is 1-methylthio-propane (MTPA).

In another example of the compound of Formula 1, the thioether is an analogue or derivative of a compound selected from the group consisting of (E) and (Z)-1-methylthio-1-propene (MTPE), Allyl methyl sulphide (AMS), 3-methylthio-1-propanol (MTPL) and 1-methylthio-propane (MTPA). Exemplary analogues or derivatives include ethyl propyl sulphide, propyl sulphide, 1-(propylthio)pentane, 1-(propylthio)butane, 2-Methyl-3-(methylthio)-1-propene, 3-Ethylthio-1-propene, 1-(methylthio)-2-butene, 1-(1-propenylthio)propane.

In another example of the compound of Formula 1, R1 is selected from unsubstituted $C_{1-6}$alkyl and R2 is selected from unsubstituted $C_{2-6}$alkenyl. In that example, R1 may be, for example, methyl, ethyl or propyl, butyl or pentyl and R2 may be, for example, allyl or 1-propenyl.

In another example, the thio compound is a thioether represented by the following Formula 2:

Formula 2

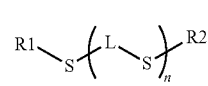

wherein n is an integer from 1 to 10; wherein L is a linker group; and wherein R1 and R2 have the same definitions as for the compounds of Formula 1, as defined above. For the avoidance of doubt, the examples of R1 and R2 groups provided above for the compounds of Formula 1 are equally applicable to the compounds of Formula 2. In one example of a compound of Formula 2, L is a linker group which is an unsubstituted $C_{1-6}$alkylene, $C_{2-6}$alkenylene, or $C_{2-6}$alkynylene.

In another example, the thio compound is a compound represented by the following Formula 3:

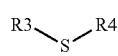

Formula 3 wherein R3 is selected from the group consisting of hydrogen, an optionally substituted alkyl group, an optionally substituted alkenyl group, an optionally substituted alkynyl group, an optionally substituted cycloalkyl group, an optionally substituted aryl group, and an optionally substituted heterocyclic group; and wherein R4 is selected from the group consisting of an optionally substituted aryl group, and an optionally substituted heterocyclic group.

In an example of the compound of Formula 3, R3 is selected from the group consisting of hydrogen; $C_{1-6}$alkyl optionally substituted with up to three substituents each independently selected from the group consisting of halo, hydroxyl, —CN, —$OC_{1-6}$alkyl; $C_{2-6}$alkenyl optionally substituted with up to three substituents each independently selected from the group consisting of halo, hydroxyl, —CN, —$OC_{1-6}$alkyl; and R4 is selected from the group consisting of a phenyl optionally substituted with halo, hydroxyl, —CN, $C_{1-6}$alkyl, —$OC_{1-6}$alkyl; and 5- to 6-membered heterocyclyl optionally substituted with up to three substituents each independently selected from halo, hydroxyl, —CN, $C_{1-6}$alkyl, —$OC_{1-6}$alkyl.

In another example of the compound of Formula 3, R3 is selected from the group consisting of hydrogen; $C_{1-6}$alkyl optionally substituted with up to three substituents each independently selected from the group consisting of from halo, hydroxyl, —CN, —$OC_{1-6}$alkyl; $C_{2-6}$alkenyl optionally substituted with up to three substituents each independently selected from the group consisting of from halo, hydroxyl, —CN, $C_{1-6}$alkyl, —$OC_{1-6}$alkyl; and R4 is

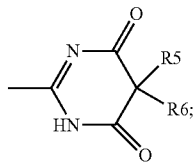

wherein R5 and R6 are independently selected from the group consisting of hydrogen; $C_{1-6}$alkyl optionally substituted with up to three substituents each independently selected from the group consisting of from halo, hydroxyl, —CN, —$OC_{1-6}$alkyl; $C_{2-6}$alkenyl optionally substituted with up to three substituents each independently selected from the group consisting of from halo, hydroxyl, —CN, —$OC_{1-6}$alkyl.

In another example of the compound of Formula 3, R3 is hydrogen, and R4 is

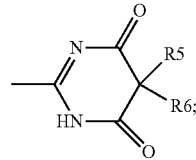

and wherein R5 and R6 are independently unsubstituted $C_{1-6}$alkyl. In one example, the compound of Formula 3 is

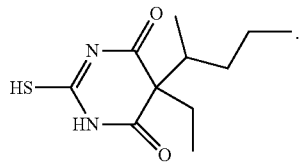 [SMILES: CCCC(C)C1(CC)C(=O)N=C(S)NC1=O]

Structures of examples of some of the thio compounds useful for the invention are provided in FIGS. 6 and 7.

In an embodiment, the thio compound is not a thiozole.

Exemplary combinations of thio compounds (e.g. thioethers) include at least 2, at least 3, at least 4, at least 5, at least 6, at least 7, at least 8, at least 9, at least 10, least 11, at least 12, at least 13, at least 14, at least 15, at least 16, at least 17, at least 18, at least 19, at least 20, least 25, at least 30, at least 35, at least 40 thio compounds according to the present invention. For example, formulations can comprise:

MTPE and AMS; MTPE and MTPL; MTPE and MTPA; AMS and MTPL; AMS and MTPA; MTPE, AMS and MTPL; MTPE, AMS and MTPA; MTPE, MTPL and MTPA; AMS, MTPL and MTPA; MTPL and Z enantiomer of MTPE; AMS and Z enantiomer of MTPE; MTPA and Z enantiomer of MTPE; MTPL, AMS and Z enantiomer of MTPE; MTPL, MTPA and Z enantiomer of MTPE; AMS, MTPA and Z enantiomer of MTPE; MTPL and E enantiomer of MTPE; AMS and E enantiomer of MTPE; MTPA and E enantiomer of MTPE; MTPL, AMS and E enantiomer of MTPE; MTPL, MTPA and E enantiomer of MTPE; AMS, MTPA and E enantiomer of MTPE; MTPL and a mixture of E and Z enantiomers of MTPE; AMS and a mixture of E and Z enantiomers of MTPE; MTPA and a mixture of E and Z enantiomers of MTPE; MTPL, AMS and a mixture of E and Z enantiomers of MTPE; MTPL, MTPA and a mixture of E and Z enantiomers of MTPE; AMS, MTPA and a mixture of E and Z enantiomers of MTPE.

In an example, formulations comprising thio compounds according to the present invention do not include $CO_2$. Such formulations may be particularly advantageous in areas where the supply of $CO_2$ is difficult or too expensive.

The present inventors have found that thio compounds affect mosquito behaviour across a range of concentrations.

The appropriate concentration of the thio compound will vary depending on where the compound is to be released and the nature of the formulation. For example, release in an enclosed space may require a lower concentration of thio compound. In contrast, release into an open area may require a higher concentration of thio compound. As another example, the concentration of the thio compound is likely to be higher in a slow release formulation compared to an aerosol for spraying in a confined space.

Exemplary activating concentrations may comprise about 0.00001% to 10%, about 0.00001 to 5%, about 0.00001 to 2%, about 0.00001 to 1%, about 0.00001 to 0.1% or about 0.00001 to 0.01% (v/v) thio compound.

$CO_2$ is a breath volatile that has been well characterised as a universal attractant/repellent for many mosquito species (Ray, 2015). $CO_2$ acts as a mosquito attractant at lower concentrations and a repellent at higher concentrations. Without wishing to be bound by any particular theory, it is hypothesised that thio compounds encompassed by the present invention bind olfactory receptors that initiate mosquito activation in response to $CO_2$. Thus, in an example, it is envisaged that thio compounds of the present invention can also act as a mosquito attractant at lower concentrations and a repellent at higher concentrations.

Exemplary attracting concentrations comprise at least 100 ppm, at least 200 ppm, at least 300 ppm, at least 400 ppm, at least 500 ppm, at least 600 ppm, at least 700 ppm, at least 800 ppm, at least 900 ppm, at least 1,000 ppm, at least 2,000 ppm, at least 3,000 ppm, at least 4,000 ppm, at least 5,000 ppm, at least 6,000 ppm, at least 7,000 ppm, at least 8,000 ppm, at least 9,000 ppm thio compound such as MTPE. For example, attracting concentrations can comprise at least 100 ppm MTPE. In another example, attracting concentrations comprise between about 100 ppm and 9,000 MTPE. In an example, these exemplary concentrations also comprise $CO_2$.

Exemplary repelling concentrations comprise at least 10,000 ppm, at least 11,000 ppm, at least 12,000 ppm, at least 13,000 ppm, at least 14,000 ppm, at least 15,000 ppm, at least 20,000 ppm, at least 30,000 ppm, at least 40,000 ppm, at least 50,000 ppm, at least 60,000 ppm, at least 70,000 ppm, at least 80,000 ppm, at least 90,000 ppm, at least 100,000 ppm, at least 200,000 ppm thio compound such as MTPE. For example, repelling concentrations can comprise at least 10,000 or at least 100,000 ppm MTPE.

Mosquitoes

Mosquitoes are small, midge-like flies which comprise the family Culicidae. Females of most species are ectoparasites, whose tube-like mouthparts (called a proboscis) pierce a hosts skin to consume blood.

Examples of mosquito genera which can be activated by a formulation of the invention include, but are not necessarily limited to *Aedeomyia, Aedes, Anopheles, Armigeres, Ayurakitia, Borachinda, Coquillettidia, Culex, Culiseta, Deinocerites, Eretmapodites, Ficalbia, Galindomyia, Haemagogus, Heizmannia, Hodgesia, Isostomyia, Johnbelkinia, Kimia, Limatus, Lutzia, Malaya, Mansonia, Maorigoeldia, Mimomyia, Onirion, Opifex, Orthopodomyia, Psorophora, Runchomyia, Sabethes, Shannoniana, Topomyia, Toxorhynchites, Trichoprosopon, Tripteroides, Udaya, Uranotaenia, Verrallina, Wyeomyia.*

In an example, the mosquito genera are known to bite humans. In another example, the mosquito genera are a known vector of a disease agent to animals or humans. For example, mosquito genera can be selected from the group consisting of *Anopheles, Aedes, Culex, Culiseta, Mansonia* or *Haemagogus*. In an example, the mosquito genus is *Aedes*. In this example, the *Aedes* species can be *Ae. aegypti*. In another example, the *Aedes* species can be *Ae. albopictus*. In an example, the mosquito genera are a known vector of a disease agent to humans.

In an example, the mosquito genera are a known vector of human malaria. In another example, the mosquito genera are a known vector of parasites from the genus *Plasmodium*. In another example, the mosquito genera are a known vector of *Plasmodium* selected from the group consisting of *Plasmodium falciparum, Plasmodium knowlesi, Plasmodium vivax, Plasmodium ovale curtisi, Plasmodium ovale wallikeri* or *Plasmodium malariae*. In an example, the mosquito genera are a known vector of *Plasmodium falciparum*. For example, the mosquito genera can be *Anopheles*. In an example, the *Anopheles* species is *An. arabiensis, An. funestus, An. gambiae, An. moucheti, An. nili, An. stephensi, An. bellator, An. cruzii, An. farauti*. For example, the *Anopheles* species is *An. gambiae*. For example, the *Anopheles* species is *An. stephensi*.

In other examples, the *Anopheles* species is *Anopheles (Cellia) aconitus; Anopheles (Nyssorhynchus) albimanus; Anopheles (Nyssorhynchus) albitarsis* species complex; *Anopheles (Cellia) annularis; Anopheles (Nyssorhynchus) aquasalis; Anopheles (Cellia) arabiensis; Anopheles (Anopheles) atroparvus; Anopheles (Cellia) balabacensis; Anopheles (Anopheles) barbirostris* species complex; *Anopheles (Cellia) culicifacies* species complex; *Anopheles (Nyssorhynchus) darling; Anopheles (Cellia) dirus* species complex; *Anopheles (Cellia) farauti* species complex; *Anopheles (Cellia) flavirostris; Anopheles (Cellia) fluviatilis* species complex; *Anopheles (Anopheles) freeborni; Anopheles (Cellia) funestus; Anopheles (Cellia) gambiae; Anopheles (Cellia) koliensis; Anopheles (Anopheles) labranchiae; Anopheles (Anopheles) lesteri* (formerly *An. anthropophagus* in China); *Anopheles (Cellia) leucosphyrus* and *Anopheles (Cellia) latens; Anopheles (Cellia) maculatus* Group; *Anopheles (Nyssorhynchus) marajoara; Anopheles (Cellia) melas; Anopheles (Cellia) merus; Anopheles (Anopheles) messeae; Anopheles (Cellia) minimus* species complex; *Anopheles (Cellia) moucheti; Anopheles (Cellia) nili* species complex; *Anopheles (Nyssorhynchus) nuneztovari* species complex; *Anopheles (Anopheles) pseudopunctipennis* species complex; *Anopheles (Cellia) punctulatus* species complex; *Anopheles (Anopheles) quadrimaculatus; Anopheles (Anopheles) sacharovi; Anopheles (Cellia) sergentii* species complex; *Anopheles (Anopheles) sinensis* species complex; *Anopheles (Cellia) stephensi; Anopheles (Cellia) subpictus* species complex; *Anopheles (Cellia) sundaicus* species complex; *Anopheles (Cellia) superpictus.*

In an embodiment, the mosquito is female.

One of skill in the art can easily identify mosquitoes falling in the above exemplified categories using publically available databases and their associated search engine(s) (e.g. http://www.map.ox.ac.uk/map/; Bionomics Search).

Formulation Preparation

Thio compounds can be converted into formulations, such as solutions, micellar solutions, emulsions, microemulsions, suspensions, solids, powders, foams, pastes, granules, gases, sprays, aerosols, gels, waxes and active-compound-impregnated natural and synthetic materials. In an example, thio compounds can be provided in formulation with smokes, such as fumigating cartridges, fumigating cans, fumigating coils and the like, and also Ultra Low Volume (ULV) cold mist and warm mist formulations. In another example, the thio compounds are formulated for release by heating.

Formulations are prepared using various known methods, for example by mixing the active compounds with extenders or carriers, such as, liquid solvents, pressurized liquefied gases and/or solid carriers. Other examples involve the use of surfactants, such as, emulsifiers and/or dispersing agents, and/or foam-formers.

In an example, water is used as an extender or carrier. In this example, it is also possible to use for example organic solvents as auxiliary solvents. Suitable exemplary liquid solvents include aromatics, such as xylene, toluene or alkylnaphthalenes; chlorinated aromatics or chlorinated aliphatic hydrocarbons, such as chlorobenzenes, chloroethylenes or methylene chloride; aliphatic hydrocarbons, such as cyclohexane or paraffins, for example mineral oil fractions; alcohols, such as butanol or glycol and also their ethers and esters; ketones, such as acetone, methyl ethyl ketone, methyl isobutyl ketone or cyclohexanone; strongly polar solvents, such as dimethylformamide and dimethyl sulphoxide.

In an example, liquefied gaseous extenders or carriers which are gaseous at ambient temperature and under atmospheric pressure are used. For example aerosol propellant, such as halogenated hydrocarbons and also butane, propane, nitrogen and carbon dioxide can be used.

In another example, solid extender or carrier is used. Exemplary solid carriers include ground natural minerals, such as kaolins, clays, talc, chalk, quartz, attapulgite, montmorillonite or diatomaceous earth, and ground synthetic minerals, such as finely divided silica, alumina and silicates.

Exemplary emulsifiers and/or foam-formers include nonionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates and also protein hydrolysates; suitable dispersing agents are: for example, lignin-sulphite waste liquors and methylcellulose.

Slow Release

In an example, formulations of the present invention are designed for slow release of thio compounds. For example, formulations can be designed to allow thio compounds to release slowly from a block, patch, canister or other apparatus. Various slow release formulations and slow release apparatus are known in the art (see for example, polymeric compositions disclosed in US20060099168; clay compositions disclosed in US20060201391 and EP548940; impregnation of fabrics disclosed in U.S. Pat. Nos. 6,015,570 and 6,326,015; composite polymer dispensers disclosed in U.S. Pat. No. 5,750,129).

Thio compounds may also be embedded in a polymer. Exemplary polymers include a cellulose ether such as methyl cellulose, ethyl cellulose, carboxymethyl cellulose, hydroxyethyl cellulose or hydroxypropyl cellulose, a cellulose ester such as acetyl cellulose, high density polyethylene, low density polyethylene, biodegradable thermoplastic polyurethane, a biodegradable ethylene polymer having ester linkages in the main chain, or a poly(epsilon-caprolactone) homopolymer.

In another example, thio compounds may be embedded in multiphase polymers that comprise "hard" and "soft" phases chemically bonded together in the polymer chain. The "hard" phase is solid at room temperature and flows upon heating. Examples include blocks of amide, ester and urethane groups. The "soft" phase is rubbery at room temperature. Examples include polyether blocks such as poly(ethylene glycol), poly(propylene glycol) or poly(tetramethylene glycol). In an example, thio compounds are embedded in the "soft" phase. In another example, the soft phase is a slow release formulation comprising the thio compound.

At room temperature, the presence of the "hard" phases in the polymer imparts strength and good mechanical properties. When the polymer is heated, phases become liquid and the polymer melts, allowing for slow release of thio compound in the molten state. Upon cooling to room temperature, the phases solidify and the good mechanical properties are regained. Examples of thermoplastic elastomers that may be suitable for providing slow release formulations include thermoplastic polyurethanes, such as those produced under the trade names ESTANE (Noveon), and PELLETHANE (Dow Chemicals); thermoplastic polyesters, also known as polyether ester copolymers, such as those produced under the trade names HYTREL (Dupont) and ARNITEL (DSM), and thermoplastic polyamides, also known as polyether amide copolymers, such as those produced under the trade name PEBAX (Atofina).

In another example, thio compounds may be formulated for impregnation in or applied to garments, belts, collars, or other articles worn or used by a subject from whom insects are to be repelled. Such formulations may also be impregnated in or applied to bedding, netting, screens and camping gear.

Various apparatus are suitable for providing slow release of the thio compounds of the present invention. Suitable apparatus include monolithic systems, laminated structures, and reservoir systems with and without rate controlling membranes (see Zeoli et al. (1982) for summary).

Other Actives

It is envisaged that the formulations of the present invention can further comprise other active compounds. For example, the formulations may further comprise other activators, attractants, repellents and insecticides or combinations thereof. It is envisaged that selection of the appropriate other actives for use in combination with the thio compounds of the present invention is well within the skill set of one in the art. Nonetheless, various exemplary actives for use in combination with the thio compounds of the present invention are provided below.

Exemplary activators, attractants and repellents include appropriate concentrations of kairomones such as alkenols (e.g., octenol; 1-octen-3-ol), alkynols (octynol), gases such as carbon dioxide, nitrogen dioxide, as well as substances such as carboxylic acids, lactic acid, butyric acids, caproic acids, propionic acids, valeric acids, ammonia, acetone and combinations thereof such as carbon dioxide and 1-octen-3-ol.

Exemplary insecticides include pyrethrins (which include cinerin I, cinerin II, jasmolin I, jasmolin II, pyrethrin I, pyrethrin II and mixtures thereof), pyrethroids, phosphates and organophosphates (which included but are not limited to chlorfenvinphos, crotoxyphos, dichlorvos, heptenophos, mevinphos, monocrotophos, naled, tetraethyl pyrophosphate (TEPP), tetrachlorvinphos) and carbamates (which include but are not limited to benomyl, carbanolate, carbaryl, carbofuran, meththiocarb, metolcarb, promacyl, propoxur, aldicarb, butocarboxim, oxamyl, thiocarboxime and thiofanox), carboxylates, chlorinated hydrocarbons, phenylureas.

In various examples, formulations can comprise at least 2, at least 3, at least 4, at least 5, at least 6, at least 7, at least 8, at least 9, at least 10 other actives.

Dispensers

It is envisaged that the thio compounds of the present invention can be released from various dispensers. Dispensers can be provided in various forms: rubber septa, hollow fibres, flakes, tape, laminated plastics, membranes over reservoirs, and polyethylene vials with acetate beads. Other, exemplary dispensers include cylinders, vaporizers, oils, candles, wicked apparatus, fans and treated articles such as clothes and mats.

It is also envisaged that the thio compounds of the present invention may be incorporated into with various insect traps and lures. Lures can vary in duration of effectiveness and distance of attraction due to differences in thio compound load and release rates. A controlled-release lure will allow the tho compound to be released in a concentration small enough to entice a mosquito into the trap, but strong enough to reach out and pull them in over a useful distance.

Exemplary trap types include container traps, tapes, combustibles and electric traps. Various traps and lures of these types are known in the art (see for example, U.S. Pat. Nos. 5,205,064; 5,799,436; 6,925,752; 7,987,631). Suitable exemplary traps and lures are commercially available such as for example, Mega-Catch™, Mosquito Magnet®, Koolatron™ and Dragonfly (BioSensory Inc.). Other exemplary suppliers of suitable traps include Biogents AG, EnviroSafe Technologies International Limited, Woodstream Corporation, Bayer AG, Reckitt Benckiser.

As outlined above, exemplary formulations comprising thio compounds according to the present invention do not include $CO_2$. These formulations can be incorporated into existing insect dispensers that may not have otherwise been suitable for mosquitoes. For example, such formulations may be incorporated into existing flying insect dispensers such as codling moth or fruit fly dispensers (see for example, U.S. Pat. Nos. 8,424,239; 5,683,687).

Suitable traps and lures may also comprise lighting arrays flashing both visible and invisible spectrums at oscillating frequencies, blue light, additional fragrance strips or lures such as an octenol strips, $CO_2$ systems including for example, burn tanks of propane for $CO_2$, heating systems to assist in attracting mosquitoes approaching the trap, baits comprising an insecticide, catch systems such as vacuum or fan directed capture in a collection net or a liquid catch container.

Methods/Use

Formulations of the invention, or a thio compound released therefrom, can be used in various methods of affecting mosquito behaviour by activating mosquitoes. In another example, the formulations are used in a method of attracting mosquitoes. In another example, the formulations are used in a method of repelling mosquitoes. In another example, the formulations are used in a method of masking a subject from mosquitoes.

The above exemplified methods comprise releasing a thio compound of the present invention to affect mosquito behaviour. The term "release" or "releasing" is used in the context of the present invention to refer to release of a thio compound into the atmosphere (e.g. the three dimensional space surrounding a subject or another particular site of release such as a mosquito trap). This may occur through a spray or similar of the formulation, or through a volatile thio compound being released, either passively or actively, from the formulation.

Suitable thio compounds such as thioethers are discussed above. For example, thioethers selected from the group consisting of allyl methyl sulphide, 1-methylthio-propane, 3-methylthio-propanol, (E)-1-methylthio-1-propene, (Z)-1-methylthio-1-propene, a derivative thereof, or a mixture of two or more thereof can be released in the above exemplified methods. Thio compounds can be released via various methods such as evaporation, diffusion, atomisation or dispersion.

The location of release will differ depending on the formulation. For example, attracting formulations can be released into the atmosphere to attract mosquitoes away from a subject. In this example, attracting formulations can be released into the atmosphere surrounding the perimeter of a subjects domicile or campsite.

In another example, repelling formulations can be released into the atmosphere to repel mosquitoes away from a subject. In another example, masking formulations can be released into the atmosphere to mask the subject from mosquitoes. In these examples, formulations can be released into the atmosphere surrounding or close to the subject such as inside the subjects domicile or campsite.

It is envisaged that in performing these methods a thio compound will be released in an appropriate concentration to impart the desired effect on mosquito behaviour. For example, an appropriate activating, attracting, repelling, masking concentration will be released. Various exemplary concentrations suitable for affecting mosquito behaviour are discussed above. Methods of determining the appropriate concentration of thio compound are also discussed above. Thus, the selection of the appropriate concentration for release is well within the skill set of one skilled in the art.

EXAMPLES

Example 1—Materials and Methods

Overview

A y-tube olfactometer was used to establish whether the volatile components of human breath elicited behavioural responses in the malaria vector *Anopheles stephensi*.

Attraction to these components was compared to a standard "positive control" known to elicit a directional response in *An. stephensi* mosquitoes placed in an olfactometer. The standard used as a positive control is a mix of compressed air, 5% $CO_2$ and an octenol source. Unpaired t-test was used to test for the differences in means for all data sets presented.

Mosquitoes

The MR4 strain of *An. stephensi* (New Delhi, India) was maintained at 27° C., 70% RH, 12:12 L:D and 30 min dawn/dusk periods). 4 to 7 day old female mosquitoes, that had never received a blood meal, were used in experiments. Mosquitoes were maintained on 10% sugar solution ad libitum but starved for 12 hr prior to testing.

Test and Control Stimuli a) Test: Allyl methyl sulphide (AMS)

b) Test: the mixture of the E and Z stereoisomers of 1-methylthio-1-propene (MTPE)

c) Test: 3-methylthio-1-propanol (MTPL; methylthio derivative; not found in breath)

d) Positive Control: 1-octen-3-ol/5% $CO_2$.

Olfactometer

The Y tube olfactometer is made entirely of glass and consists of a release chamber, the Y tube itself, and a trap chamber attached to each arm (FIG. 1). Each trap chamber is divided in two by a fine glass filter. On the far side of those filters, the trap chambers can connect to charcoal filters or to gas bags or gas cylinders. Air is pulled through the olfactometer by connecting the release chamber to a vacuum tap which vents the contents of the tube. Standard air flow (0.4 L/minute) is maintained using a 0.1-1.2 LPM flow meter (John Morris Pty, LTD). The air volume of the Y-tube is approximately 1 litre and is therefore replaced every 2.5 minutes.

One arm is attached to a gas bag of clean air (from a compressed air cylinder) plus 5% $CO_2$.

The other arm remains connected to a carbon filter and the air inlet to give a plume of compressed air plus test stimuli (i.e. standard air concentration of $CO_2$ only).

Test Sample Preparation

1 µl $10^{-2}$ to $10^{-5}$% test stimuli in mineral oil (Sigma Aldrich) was spotted on 1 $cm^2$ Whatman filter paper.

Test stimuli was delivered by placing treated filter paper between the air inlet and the trap chamber to give a plume of compressed air plus test stimuli (i.e. standard air concentration of $CO_2$ only).

Control Sample Preparation

1 µl $10^{-4}$% 1-octen-3-ol in mineral oil (Sigma Aldrich) was spotted on 1 $cm^2$ Whatman filter paper.

5% $CO_2$ by volume was added to a 10 L FlexFilm gasbag (SKC Inc.) of compressed air.

When a $CO_2$/1-octen-3-ol mix was required, 5% $CO_2$ was delivered by connecting the gas bag to the requisite Y tube arm and placing the 1-octen-3-ol treated filter paper between the gasbag inlet and the glass filter of the trap chamber.

Purified air was introduced via charcoal filters attached to the far side of the trap chambers.

Mosquito Releases

All experiments were run under PC2 quarantine conditions, at 27° C., 70% RH, under infrared light. Observers were always in the same position during the tests, at the trap chamber end of the olfactometer, between the 2 arms of the Y tube.

Using an aspirator, 25-30 starved female *An. stephensi* were introduced into the release chamber (FIG. 1).

The experiment was terminated when mosquitoes become habituated to the stimuli and did not respond further (usually 4-6 min). After each test, mosquitoes were carefully aspirated from the apparatus by disconnecting constituent parts. The apparatus was flushed with clean air (charcoal filters only) for 5 minutes before the next batch of stimuli was introduced.

A total of 10 replicates (different batches of mosquitoes) were run for each stimuli assessment. Treatment and control arms were alternated between replicates. After completion of 10 replicates, the apparatus was rinsed in acetone and allowed to dry overnight.

Measurement of Activation

Many arthropods respond to semiochemicals at specific dose ranges. At least under laboratory settings, chemicals that elicit a positive directional response at some concentrations may exhibit a more general, undirected excitation, or even repellency at other concentrations (Knols, B. et al., "Odour-mediated, host-seeking behviour of *Anopheles* mosquitoes: a new approach", Annals of Tropical Medicine and Parasitology, 91(1): S117-S118 (1997); Smallegange, R. et al., "Synergism between ammonia, lactic acid and carboxylic acids as kairomones in the host-seeking behaviour of the malaria mosquito *Anopheles gambiae* sensu stricto (Diptera: Culicidae)", Chem. Senses (30: 145-152 (2005); Vale, G. et al., "The use of 1-octen-3-ol, acetone and carbon dioxide to improve baits for tsetse flies, *Glossina* spp. (Diptera: Glossinidae)", Bull. ent. Res. 75: 219-231 (1985). and Hall, D. et al., "1-OCTEN-3-OL; A potent Olfactory Stimulant and Attractant for Tsetse Isolated From Cattle Odours", Insect. Sci. Applic., 5(5): 335-339 (1984).

Initial experiments were therefore less concerned with directional responses and more with establishing the range of doses that appeared to cause some form of excitation. Those initial experiments were conducted in comparison to a neutral control (a negative would be repellent) of clean air drawn through a charcoal filter. The test stimuli were tested against mosquitoes at serial dilutions in the range $10^{-2}$ to $10^{-5}$%.

Once mosquitoes had stopped responding, the numbers in the olfactometer arms, base leg and release chamber were counted. Mosquitoes were assumed to have been "activated" if they moved into the Y tube arms.

Measurement of Attraction

Once the range of doses that "activated" mosquitoes had been established, the capacity of those concentrations to initiate a directional response was tested. In this instance, experiments were conducted in comparison to a positive control of $CO_2$/1-octen-3-ol [$10^{-4}$% v/v]. $CO_2$/1-octen-3-ol was used as the positive control as this mixture was consistently more attractive to mosquitoes than $CO_2$ alone. A positive control was used to assess whether test stimuli were at least as attractive as a standard directional stimulus.

Test stimuli were tested against mosquitoes at the doses that had been shown to activate them and their capacity to attract was assessed by comparing the numbers of mosquitoes in the control and treatment arms of the olfactometer.

Example 2—Mosquito Activation and Attraction

Y-tube olfactometry experiments were performed on *Anopheles stephensii*. Mosquito activation and attraction was measured following exposure to test compounds allyl methyl sulphide (AMS), 3-methylthio-propanol (MTPL) and 1-methylthio-1-propene (as a mix of E and Z enantiomers) (MTPE).

Test compounds elicit activation responses (i.e. mosquitoes become excited or irritated) and directional responses (i.e. mosquitoes display a chemotaxis towards the stimulus) at low concentrations.

Activation

Test compounds were compared against a neutral control of clean air drawn through a charcoal filter. MTPE initiates its greatest activation response at a concentration of 0.0001% v/v. Activation was reduced at lower (0.00001%) and higher (0.001-0.01%) concentrations (v/v) (FIG. 2). AMS initiates its greatest activation response at a concentration of 0.00001% v/v. AMS caused activation at 0.00001% v/v (FIG. 3). Methylthio derivative MTPL also initiated an activation response across a wide range of concentrations (0.00001-0.01%) (FIG. 4).

Attraction

Test compounds were compared against a known attractant, a mixture of 1-octen-3-ol/$CO_2$ to determine whether they were also mosquito attractants. AMS was twice as attractive as 1-octen-3-ol/$CO_2$ at 0.00001% (FIG. 5A); MTPE was more attractive than 1-octen-3-ol/$CO_2$ at 0.0001% (FIG. 5B) and MTPL was 1.5 more attractive than 1-octen-3-ol/$CO_2$ at 0.01% (FIG. 5C).

Summary

A summary of the data from the activation and attraction experiments is provided in Table 2.

TABLE 2

Summary of Mosquito Activation and Attraction.

| | AMS | | MTPE | | MTPL | |
| --- | --- | --- | --- | --- | --- | --- |
| Dilution | Activation (against clean air) | Attraction (against CO2 + 1-octen-3-ol) | Activation (against clean air) | Attraction (against CO2 + 1-octen-3-ol) | Activation (against clean air) | Attraction (against CO2 + 1-octen-3-ol) |
| 0.01 ($10^{-2}$)% | Yes | Not tested | Yes | Not tested | Yes | Not tested |
| 0.001 ($10^{-3}$)% | Not tested | Not tested | Yes | Not tested | Yes | Not tested |

TABLE 2-continued

Summary of Mosquito Activation and Attraction.

| Dilution | AMS Activation (against clean air) | AMS Attraction (against CO2 + 1-octen-3-ol) | MTPE Activation (against clean air) | MTPE Attraction (against CO2 + 1-octen-3-ol) | MTPL Activation (against clean air) | MTPL Attraction (against CO2 + 1-octen-3-ol) |
|---|---|---|---|---|---|---|
| 0.0001 ($10^{-4}$)% | Yes | Not tested | Yes | Yes | Yes | Not tested |
| 0.00001 ($10^{-5}$)% | Yes | Yes | Yes | Not tested | Not Tested | Not tested |

These data indicate that the test compounds (FIG. 6) elicit strong, activation and attraction responses in mosquitoes suggesting that they are useful activators such as attractants. Further, the data indicates that the test compounds elicit activation and attraction responses in mosquitoes without the addition of any other attractant, synergist or potentiator such as $CO_2$.

Example 3—Field Trials

Field trials based on an imperfect Latin square design compared the attraction of *An. farauti* to MTPE with and without $CO_2$. Treatments included $CO_2$ alone, $CO_2$ in combination with MTPE lure, or MTPE lure alone. Centres for Disease Control and Prevention (CDC) light traps were used to deliver MTPE lures and/or $CO_2$. MTPE lures consisted of 500 μl of MTPE in mineral oil, 10-100,000 ppm spread on filter paper. MTPE/mineral oil mixtures were spread on filter paper, rolled into a tight wick, and inserted into a specimen tube. Specimen tubes where then wired to a CDC trap. $CO_2$ was delivered using 1 kg dry ice, hung above a CDC light trap, as per standard sampling protocols. MTPE+/−$CO_2$ combinations were randomised between 4 trap positions over three nights. Traps were placed at least 50 m apart to manage interference and were set between 5 pm and 7 am each night. Trap catches were subsequently returned to the laboratory, counted and identified as "*Anopheles farauti* s.l" or "other".

As $CO_2$ is a known mosquito attractant, all catches were compared to $CO_2$ alone. Trial design is shown in Table 3. "*Anopheles farauti* s.l" or "other" mosquito catch numbers are shown in Tables 4 and 5. Results (FIGS. 8 and 9) indicated:
Dose dependent attractancy;
MTPE at 100 ppm is attractive;
10,000 ppm MTPE is not attractive, possibly repellent;
100,000 ppm MTPE is not attractive, possibly repellent; and,
$CO_2$ synergises attractancy of 1,000 ppm MTPE.

TABLE 3

Field trial design.

| Trap position↓ | Days→ 1 | 2 | 3 |
|---|---|---|---|
| 1 | CO2 alone | CO2 + 1000 ppm | 100,000 ppm |
| 2 | 100,000 ppm | 10,000 ppm | CO2 + 1000 ppm |
| 3 | CO2 + 1000 ppm | CO2 alone | 100 ppm |
| 4 | 10,000 ppm | 100,000 ppm | CO2 alone |

TABLE 4

*Anopheles farauti* s.1 catch numbers.

| Trap position↓ | Days→ 1 | 2 | 3 |
|---|---|---|---|
| 1 | 44 | 89 | 4 |
| 2 | 2 | 2 | 78 |
| 3 | 63 | 36 | 28 |
| 4 | 0 | 0 | 83 |

TABLE 5

Total mosquito catch numbers.

| Trap position↓ | Days→ 1 | 2 | 3 |
|---|---|---|---|
| 1 | 206 | 203 | 36 |
| 2 | 33 | 49 | 264 |
| 3 | 358 | 233 | 189 |
| 4 | 18 | 12 | 298 |

Example 4—Electrophysiology Studies

In order to assess Y-tube olfactometry experiments and field trials using an independent technique and to investigate the physiological basis of the observed activation and attraction behaviour, electroanntennogram (EAG) and electropalpogram (EPG) studies were performed on *A. stephensi* female mosquitoes. EAG studies were also performed on *Anopheles farauti*, *Culex annulirostris* and *Aedes aegypti* female mosquitoes.

Five to eight days *Anopheles stephensi*, two to fourteen days old *Culex annulirostris* and *Aedes aegypti* as well as four days old *Anopheles faraulti* non-blooded females, fed on 10% sucrose ad-libitum and then starved for >12 hours, were used. Mosquito head was excised and placed on the reference electrode coated with electrode gel (Parker Laboratories, Orange, N.J.). The distal end of the antennae or palp (<0.5 mm), cut to ensure a good electrical contact, were carefully placed on the recording electrode (Syntech, Germany). Signals were fed to a 10× amplifier and processed with IDAC 4 and PC-based interface and EAG software package (Syntech, Germany).

1-octen-3-ol, an odour attractive to mosquitoes first identified from cows (Hall et al. 1984) and human sweat (Cork, A. et al., "Identification of electrophysiologically-active compounds for the malaria mosquito, *Anopheles gambiae*, in human sweat extracts" Medical and Veterinary Entomology, 10: 269-276 (1996)), elicits significant EAG response from female *Anopheles funestus* and *An. gambiae* antennae (Cork, A. et al., "Identification of electrophysiologically-active compounds for the malaria mosquito, *Anopheles gambiae*, in human sweat extracts" Medical and Veterinary Entomology, 10: 269-276 (1996); Costantini, C. et al., "Electroantennogram and behavioural responses of the malaria vector *Anopheles gambiae* to human-specific sweat components", Medical and Veterinary Entomology, 15: 259-266 (2001)). Thus 1-octen-3-ol was used in the EAG analysis as a positive control with thio compounds, (E and Z)-1-methylthio-1-propene, 3-methyl-thio-1-propanol, ally methyl sulphide, and carbon dioxide (5%) and mineral oil (negative control). Pure chemicals were diluted in mineral oil to a 10 times v/v stock solution, from which decadal dilutions were made. A 10 µl aliquot of each solution was applied to a filter paper strip (1×3.5 cm; Whatman No. 4, Fisher Scientific) and the solvent was evaporated under a fume hood before inserting the paper strip into 5 ml disposable plastic syringe (Terumo syringes). A 500 ms pulse (5 ml/s) was delivered by stimulus controller CS-55 (Syntech, Germany) to deliver chemical stimulants to a humidified continuous air flow (10 ml/s) over the electrophysiolgical preparation. The chemicals were tested randomly and applied with 0.5-1 min intervals between stimulations.

Initial screening was performed using a 10 times dilution (1/10, v/v) source dose solution. Then 1-methylthio-1-propene and 1-octen-3-ol were selected for further dose-response study. A minimum of five mosquitoes were tested for each compound to calculate the average EAG amplitude±standard error (SE).

Initial EAG experiments on *A. stephensi* showed antennae significantly responded to all tested thio compounds and also to 1-octen-3-ol (FIG. 10). 1-methylthio-1-propene elicited the strongest response in antenna, surprisingly stronger than the response to 1-octen-3-ol.

1-methylthio-1-propene, allyl methyl sulphide and $CO_2$ (positive control) elicited significant responses on the maxillary palps, while methyl-thio-1-propanol and 1-octen-3-ol did not (FIG. 11). Again 1-methylthio-1-propene elicited the strongest response even in comparison with $CO_2$. The EAG and EPG responses of *A. stephensi* non bloodfed females for 1-methylthio-1-proene are dose dependant (FIG. 12).

The EAG response of *Anopheles farauti* to the thio compounds was similar to *A. stephensi* and *A. farauti* antennae, significantly responding to all tested thio compounds and also to 1-octen-3-ol (FIG. 13). However, 1-methylthio-1-propene elicited the strongest response in antenna (FIG. 13). Thio compounds and $CO_2$ also elicited significant responses on the maxillary palps, while 1-octen-3-ol did not (FIG. 14). Again 1-methylthio-1-propene elicited the strongest response even in comparison with $CO_2$ (FIG. 5).

Extending the study to look at more distantly related mosquito species showed that 1-methy-lthio-1-propene elicited the strongest response in the *Anopheles* species whereas 1-octen-3-ol and 3-methyl-thio-1-propanol elicited the strongest response in *C. annulirostis* antennae (FIG. 15). 3-methyl-thio-1-propanol also elicited the strongest response in *A. aegypti* antennae (FIG. 16).

Example 5—Assessing Formulations

Efficacy of formulations to activate mosquitoes can also be assessed by releasing them into the atmosphere over a period of time and assessing mosquito activation visually. In brief a test and control formulation is provided. The test formulation comprises a thio compound and the control formulation releases 1-octen-3-ol and $CO_2$. An increase in the number of mosquitoes activated by the test formulation relative to the control formulation indicates that the test formulation will be an effective mosquito activator.

Efficacy of compounds to attract mosquitoes to commercially available traps can also be assessed over a period of time. A test and control trap is provided. The test trap is provided with a thio compound and the control trap is provided with a lure containing 1-octen-3-ol and a $CO_2$ source. Mosquito attraction can be assessed based on the number of mosquitoes caught in each trap. An increase in the number of mosquitoes caught in the test trap relative to the control indicates that the test compound will be an effective addition to commercially available traps.

Example 6—Mosquito Lure

Test compounds allyl methyl sulphide (AMS), 3-methyl-thio-propanol (MTPL) and 1-methylthio-1-propene (as a mix of E and Z enantiomers) (MTPE) are formulated for release from a cylinder, vaporizer, oil, candle, strip or similar. Formulations may also comprise additional known mosquito attractants such as 1-octen-3-ol. The activating and attraction properties of the test compounds indicate that these lures will be effective at attracting mosquitoes.

Example 7—Mosquito Trap

Test compounds allyl methyl sulphide (AMS), 3-methyl-thio-propanol (MTPL) and 1-methylthio-1-propene (as a mix of E and Z enantiomers) (MTPE) are formulated for release from existing mosquito traps. Various mosquito traps are currently commercially available from suppliers such as Biogents AG, EnviroSafe Technologies International Limited, Woodstream Corporation, Koolatron, Biosensory Inc., Bayer AG, Reckitt Benckiser. The activating and attraction properties of the test compounds indicate that these modified traps will be effective at attracting mosquitoes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The present application claims priority from AU 2015904254 filed 16 Oct. 2015, the disclosure of which is incorporated herein by reference.

All publications discussed above are incorporated herein in their entirety.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

REFERENCES

Cork et al. (1996) Med Vet Entomol 10:269-276.
Costantini et al. (2001) Med Vet Entomol 15:259-266.
Dekker et al. (2002) Med Vet Entomol. 16:91-98.
Hall et al. (1984) Insect Science and Its Application. 5:5.
Knols et al. (1997) Annals of Tropical Medicine and Parasitology 91:S117-S118.
Lorenz et al. (2013) Parasites and Vectors, 6:1-12.
Ray (2015) Current opinion in Neurobiology 34:158-164.
Ritchie and Devine (2013) Parasites and Vectors, 6: 1-9.
Smallegange et al. (2005) Chemical Senses 30:145-152.
Trexler et al. (1998) J Med Entomol 35:967-976.

Vale and Hall (1985) Bulletin of Entomological Research 75:219-231.

Zeoli et al. (1982) Insect Suppression with Controlled Release Pheromone Systems, vol. 1, CRC Press Inc., Boca Raton, Fla.: 131-144.

The invention claimed is:

1. A mosquito activating formulation comprising a thioether compound selected from the group consisting of allyl methyl sulphide, 1-methylthio-propane, 3-methylthio-propanol, (E)-1-methylthio-1-propene, (Z)-1-methylthio-1-propene, and a mixture of two or more thereof.

2. The formulation of claim 1, wherein the formulation does not contain carbon dioxide.

3. The formulation of claim 1, which comprises (E)-1-methylthio-1-propene and (Z)-1-methylthio-1-propene.

4. The formulation of claim 1, which is a mosquito attractant.

5. The formulation of claim 4, further comprising one or more other insect attractants.

6. The formulation of claim 5, wherein the one or more other insect attractants are selected from the group consisting of carbon dioxide, 1-octen-3-ol, ammonia, lactic acid, or a mixture of two or more thereof.

7. The formulation of claim 1 which repels mosquitoes.

8. The formulation according to claim 1 which is a solution, an oil, a gel, a cream, a wax, a solid, a gas, a spray or a foam.

9. A trap or lure which comprises a formulation according to claim 1.

10. A method for activating mosquitoes, the method comprising releasing the thioether compound from a formulation according to claim 1.

11. The formulation according to claim 1, wherein the mosquito is an *Anopheles* spp., *Aedes* spp., *Culex* spp., *Culiseta* spp., *Haemagogus* spp. or a combination of two or more thereof.

12. The formulation of claim 1, wherein the mosquito is *Anopheles* spp. or *Aedes* spp.

* * * * *

UNITED STATES PATENT AND TRADEMARK OFFICE
CERTIFICATE OF CORRECTION

PATENT NO. : 10,701,931 B2  
APPLICATION NO. : 15/768456  
DATED : July 7, 2020  
INVENTOR(S) : Amalia Berna et al.

Page 1 of 1

It is certified that error appears in the above-identified patent and that said Letters Patent is hereby corrected as shown below:

On the Title Page

Item (73) Assignee: --The Council of the Queensland Institute of Medical Research, Herston, Queensland (AU)-- should be added after Commonwealth Scientific and Industrial Research Organisation, Acton, Australian Capital Territory (AU)

Signed and Sealed this
Twenty-seventh Day of October, 2020

Andrei Iancu
*Director of the United States Patent and Trademark Office*